US012116804B2

(12) United States Patent
Romero

(10) Patent No.: US 12,116,804 B2
(45) Date of Patent: Oct. 15, 2024

(54) SLIDING DEADBOLT

(71) Applicant: ASSA ABLOY Americas Residential Inc., New Haven, CT (US)

(72) Inventor: Oscar Romero, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 396 days.

(21) Appl. No.: 17/371,492

(22) Filed: Jul. 9, 2021

(65) Prior Publication Data

US 2022/0010586 A1 Jan. 13, 2022

Related U.S. Application Data

(60) Provisional application No. 63/050,575, filed on Jul. 10, 2020.

(51) Int. Cl.
*E05B 1/00* (2006.01)

(52) U.S. Cl.
CPC .... *E05B 1/0046* (2013.01); *E05B 2001/0076* (2013.01); *E05Y 2201/638* (2013.01)

(58) Field of Classification Search
CPC ................ Y10T 292/57; E05B 1/0046; E05B 2001/0076; E05Y 2201/638; E05C 9/12; E05C 9/021; E05C 9/041
USPC ................................ 292/137, 172, 142, 279
See application file for complete search history.

(56) References Cited

U.S. PATENT DOCUMENTS 1,387,643 A * 8/1921 Erickson ................ E05B 63/20 292/334
2,087,829 A * 7/1937 Wraae ...................... E05C 1/14 292/164
3,347,581 A * 10/1967 Hann ....................... E05C 1/04 292/147
3,785,686 A * 1/1974 Armstrong ............... E05C 1/14 292/336.3

(Continued)

FOREIGN PATENT DOCUMENTS

AU 2016358305 A1 * 7/2018 .......... E05B 17/005
CA 2754986 C * 1/2016 ............ E05B 59/00

(Continued)

OTHER PUBLICATIONS

KR20170098157A Epacenet machine translation, description and claims, Dec. 26, 2016 (Year: 2023).*

(Continued)

*Primary Examiner* — Kristina R Fulton
*Assistant Examiner* — Steven A Tullia
(74) *Attorney, Agent, or Firm* — Merchant & Gould P.C.

(57) ABSTRACT

A deadbolt includes a bolt assembly structured to mount inside a cavity between interior and exterior sides of a door. The bolt assembly includes a bolt housed inside a deadbolt latch. An exterior assembly is structured to mount onto the exterior side of the door. The exterior assembly is operably connected to the deadbolt latch to move the bolt between a retracted position and an extended position. An interior assembly is structured to mount onto the interior side of the door. The interior assembly is operably connected to the deadbolt latch and includes a manual actuator being operable to slide in opposite first and second linear directions causing the deadbolt latch to move the bolt between the retracted and extended positions.

18 Claims, 28 Drawing Sheets

(56) References Cited

U.S. PATENT DOCUMENTS

| | | | | | |
|---|---|---|---|---|---|
| 3,853,340 | A * | 12/1974 | Arfelt | E05C 1/12 | 70/432 |
| 4,052,092 | A * | 10/1977 | Bergen | E05C 1/14 | 70/462 |
| 4,438,963 | A * | 3/1984 | Friedrich | E05B 1/0038 | 292/168 |
| 4,483,162 | A * | 11/1984 | Dunphy | E05B 63/0017 | 70/134 |
| 4,490,999 | A * | 1/1985 | Castle | E05B 41/00 | 70/330 |
| 4,502,716 | A * | 3/1985 | Tsai | E05B 63/0017 | 292/172 |
| 4,580,423 | A * | 4/1986 | Craig | E05B 63/0017 | 70/151 R |
| 4,593,542 | A * | 6/1986 | Rotondi | E05B 63/06 | 292/DIG. 60 |
| 4,658,664 | A * | 4/1987 | Jacobs | E05C 1/16 | 292/172 |
| 4,902,057 | A * | 2/1990 | Ching | E05B 63/06 | 292/DIG. 60 |
| 5,002,322 | A * | 3/1991 | Fukumoto | E05B 47/0012 | 292/201 |
| 5,184,523 | A * | 2/1993 | Nyzedatny | F16H 61/22 | 74/471 XY |
| 5,513,505 | A * | 5/1996 | Dancs | E05B 65/1086 | 292/DIG. 60 |
| 5,676,407 | A * | 10/1997 | Smallegan | E05B 13/005 | 292/139 |
| 6,023,952 | A * | 2/2000 | Mantarakis | E05B 53/00 | 292/336.3 |
| 6,116,662 | A * | 9/2000 | Johnson | E05B 63/0017 | 292/172 |
| 6,712,407 | B2 * | 3/2004 | Duriez | E05B 81/14 | 292/201 |
| 7,712,343 | B2 * | 5/2010 | Smith | E05B 13/004 | 70/483 |
| 7,963,134 | B2 * | 6/2011 | Rafferty | E05B 13/00 | 192/84.92 |
| 8,302,437 | B2 * | 11/2012 | Fang | E05B 65/1086 | 70/91 |
| 8,353,188 | B1 * | 1/2013 | Byerly | E05B 13/005 | 70/210 |
| 8,517,434 | B1 * | 8/2013 | Reep, Sr. | E05B 13/004 | 292/226 |
| 8,579,338 | B1 * | 11/2013 | Shah | E05C 1/04 | 292/1.5 |
| 9,033,375 | B1 * | 5/2015 | Moon | E05B 1/003 | 292/336.3 |
| 9,222,286 | B2 * | 12/2015 | Uyeda | E05C 1/002 | |
| 9,394,732 | B1 * | 7/2016 | Ahmad | E05B 1/0046 | |
| 2002/0195826 | A1 * | 12/2002 | Fountaine | E05B 9/08 | 292/96 |
| 2004/0239121 | A1 * | 12/2004 | Morris | E05C 9/041 | 292/39 |
| 2006/0042336 | A1 * | 3/2006 | Smith | E05B 13/004 | 70/432 |
| 2007/0194576 | A1 * | 8/2007 | Esposito | E05C 1/166 | 292/143 |
| 2009/0071204 | A1 * | 3/2009 | Garza | E05B 63/18 | 70/107 |
| 2009/0308112 | A1 * | 12/2009 | Uyeda | E05C 7/04 | 70/91 |
| 2010/0263418 | A1 * | 10/2010 | Moon | E05B 63/16 | 292/61 |
| 2011/0221211 | A1 * | 9/2011 | Weron | E05B 63/20 | 292/64 |
| 2011/0314878 | A1 | 12/2011 | Roth et al. | | |
| 2013/0340492 | A1 * | 12/2013 | Gendig | E05B 63/16 | 292/57 |
| 2015/0145266 | A1 * | 5/2015 | Song | E05B 1/0038 | 292/336.3 |
| 2016/0040454 | A1 | 2/2016 | Viviano | | |
| 2016/0115720 | A1 * | 4/2016 | Wong | E05B 15/02 | 49/506 |
| 2019/0071901 | A1 | 3/2019 | Balcom | | |
| 2019/0128030 | A1 | 5/2019 | Bacon | | |
| 2020/0173197 | A1 * | 6/2020 | Jean | E05B 65/0811 | |
| 2020/0224458 | A1 * | 7/2020 | Root | E05B 65/087 | |
| 2020/0392762 | A1 * | 12/2020 | Wang | E05B 13/002 | |

FOREIGN PATENT DOCUMENTS

| | | | | |
|---|---|---|---|---|
| CN | 102312610 | | 1/2012 | |
| EP | 0351307 | A1 * | 7/1989 | E05B 1/0069 |
| EP | 1462592 | A2 * | 9/2004 | E05B 55/00 |
| EP | 2405085 | A2 * | 1/2012 | E05B 63/0017 |
| EP | 3190248 | A1 * | 7/2017 | E05B 1/0046 |
| EP | 3623548 | A1 * | 3/2020 | E05B 1/0046 |
| FR | 2884270 | A1 * | 10/2006 | E05B 1/003 |
| GB | 2029491 | A * | 3/1980 | E05B 5/00 |
| GB | 2439212 | A * | 12/2007 | E05B 17/2088 |
| JP | 2007284975 | A | 11/2007 | |
| KR | 20110036425 | A * | 4/2011 | |
| KR | 101718993 | B1 * | 7/2015 | E05B 63/22 |
| KR | 101732274 | B1 * | 10/2015 | E05B 65/0035 |
| KR | 20170098157 | A * | 12/2016 | E05B 1/0061 |
| KR | 200489832 | Y1 * | 9/2018 | E05B 13/105 |
| WO | WO-0075466 | A1 * | 12/2000 | E05B 7/00 |
| WO | WO-2010108592 | A1 * | 9/2010 | E05B 1/0092 |
| WO | WO-2011064386 | A2 * | 6/2011 | E05B 41/00 |
| WO | WO-2017027335 | A1 * | 2/2017 | E05B 53/00 |
| WO | WO-2019012316 | A1 * | 1/2019 | E05B 9/08 |

OTHER PUBLICATIONS

International Search Report and Written Opinion for International Application No. PCT/US2021/041144, mailed Nov. 4, 2021.
PCT International Preliminary Report on Patentability in Application PCT/US2021/041144, mailed Jan. 19, 2023, 6 pages.

* cited by examiner

SLIDING DEADBOLT

CROSS-REFERENCE TO RELATED APPLICATIONS

The present application claims priority from U.S. Provisional Patent Application No. 63/050,575, filed on Jul. 10, 2020, the disclosure of which is hereby incorporated by reference in its entirety.

BACKGROUND

A deadbolt is type of locking mechanism that typically requires the rotation of a turn-piece to extend and retract a bolt in order to lock and unlock a door. When the door is closed, rotating the turn-piece in one direction, such as in a clockwise direction, causes the bolt to extend outwardly from the door and into a cavity of a doorframe, thereby locking the door with respect to the doorframe. Rotating the turn-piece in an opposite direction, such as in a counter-clockwise direction, causes the bolt to retract back inside the door to unlock the door.

Generally, when the turn-piece is rotated to lock and unlock the door, the turn-piece is required to over-rotate such that the turn-piece does not stop at a precise vertical position or a precise horizontal position. This is because turn-pieces are typically designed to rotate about 110 degrees to throw the bolt approximately one inch. This not only degrades the aesthetic appearance of the deadbolt, but also makes the deadbolt difficult to operate especially for individuals who have arthritis of the wrist. Therefore, improvements are desired.

SUMMARY

The present disclosure is directed to a deadbolt that provides a manual actuator that can be operated to slide in a linear movement to lock and unlock a door. In some embodiments, the linear movement is horizontal. In other embodiments, the linear movement is vertical.

In one aspect, a deadbolt comprises a bolt assembly structured to mount inside a cavity between interior and exterior sides of a door, the bolt assembly including a bolt housed inside a deadbolt latch; an exterior assembly structured to mount onto the exterior side of the door, the exterior assembly being operably connected to the deadbolt latch to move the bolt between a retracted position and an extended position; and an interior assembly structured to mount onto the interior side of the door, the interior assembly being operably connected to the deadbolt latch and including a manual actuator being operable to slide in opposite first and second linear directions causing the deadbolt latch to move the bolt between the retracted and extended positions.

In some embodiments, the linear direction includes first and second horizontal directions along an axis parallel to a width of the door. In other embodiments, the linear direction includes first and second vertical directions along an axis parallel to a height of the door.

The exterior assembly can further include a plug housed inside the exterior assembly, the plug defining a key hole, and a tailpiece that extends from the plug and rotates when a key inserted into the key hole is rotated, wherein rotation of the tailpiece causes the deadbolt latch to move the bolt between the retracted and extended positions.

In one embodiment, the interior assembly includes: a driver operably connected to the manual actuator to slide in the first and second linear directions, the driver having first and second pivot points; a cam engaged between first and second pivot points of the driver, and structured to rotate in clockwise and counterclockwise directions from the driver sliding in the first and second linear directions; and a latch shaft engaged with the cam, wherein rotation of the cam causes the latch shaft to rotate, and rotation of the latch shaft causes a cam in the deadbolt latch to move the bolt in a linear direction between the retracted and extended positions. The interior assembly includes a rail, and the driver is mounted to slide along the rail inside the interior assembly. The interior assembly further includes a cover plate having a slot allowing the manual actuator to slide in the linear direction. The manual actuator can be a handlebar or a knob.

In one embodiment, the interior assembly includes: a linear gear attached to the manual actuator; a circular gear engaged with the linear gear such that the linear gear causes the circular gear to rotate in clockwise and counterclockwise directions when the manual actuator is operated to slide in the first and second linear directions; and a latch shaft engaged with the circular gear, wherein rotation of the circular gear causes the latch shaft to rotate, and rotation of the latch shaft causes a cam in the deadbolt latch to move the bolt in a linear direction between the retracted and extended positions. A housing is nested inside the manual actuator. The housing includes rails on opposite sides, and the manual actuator is mounted to slide on the rails of the housing in the first and second linear directions. The housing has a display that is viewable when the bolt is in the retracted position, and that is hidden when the bolt is in the extended position. The display indicates that the bolt is in the retracted position. The manual actuator covers the interior assembly.

In another embodiment, the interior assembly includes: first and second manual actuators each being operable to slide in opposite first and second linear directions along parallel axes; a first driver connected to the first manual actuator, the first driver being slidable in the first and second linear directions in a first slot defined by a cover plate, and the first driver including first and second pivot points; a second driver connected to the second manual actuator, the second driver being slidable in the first and second linear directions in a second slot defined by the cover plate, the first and second slots being spaced apart and parallel with one another, and the second driver including first and second pivot points; a cam engaged between the first and second pivot points of the first driver and between the first and second pivot points of the second driver, wherein the sliding of the first and second manual actuators in the first and second linear directions causes the cam to rotate in clockwise and counterclockwise directions; and a latch shaft engaged with the cam, wherein rotation of the cam causes the latch shaft to rotate, and rotation of the latch shaft causes the deadbolt latch to move the bolt in a linear direction between the retracted and extended positions. Sliding the first manual actuator in the first linear direction causes the second manual actuator to slide in the second linear direction, and sliding the second manual actuator in the first linear direction causes the first manual actuator to slide in the second linear direction. Sliding the first manual actuator in the first linear direction causes the bolt to move from the retracted positon to the extended position, and sliding the second manual actuator in the first linear direction causes the bolt to move from the extended positon to the retracted position. The cover plate is structured to mount onto an attachment plate, and the attachment plate is structured to attach to the interior side of the door by elongated fasteners that are threaded through the attachment plate, the bolt assembly and into the exterior assembly to fixedly secure the deadbolt to the door. The first and second manual actuators are offset with respect to one another along the parallel axes.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
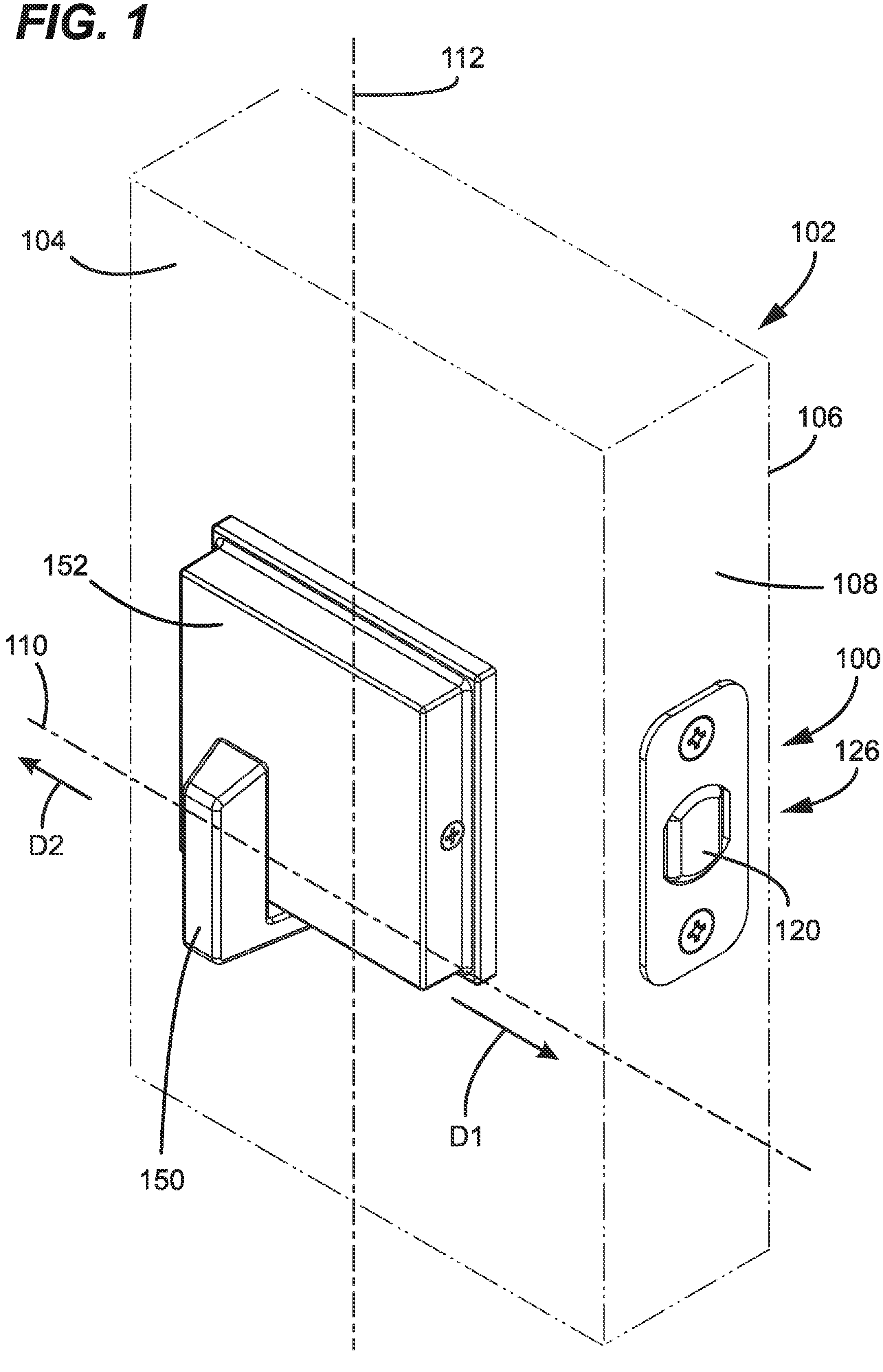
FIG. 1 is a perspective view of a deadbolt installed on an interior side of a door according to one embodiment of the present disclosure, with the deadbolt shown in a retracted position.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

This disclosure generally relates to a deadbolt with certain features that replace a rotatable turn-piece with a manual actuator that can be operated to slide in a linear movement to lock and unlock a door. In some embodiments, the linear movement is a horizontal movement that is defined by an axis parallel to a width of the door. In other embodiments, the linear movement is a vertical movement that is defined by an axis parallel to a height of the door.

While certain embodiments are directed to operating the manual actuator with a horizontal movement to extend and retract the deadbolt and thereby lock and unlock a door, these embodiments may be adapted to operate the manual actuator in a vertical movement. Similarly, embodiments that are directed to operating the manual actuator with a vertical movement to extend and retract the deadbolt can be adapted to operate the manual actuator in a horizontal movement.

Figure 5:
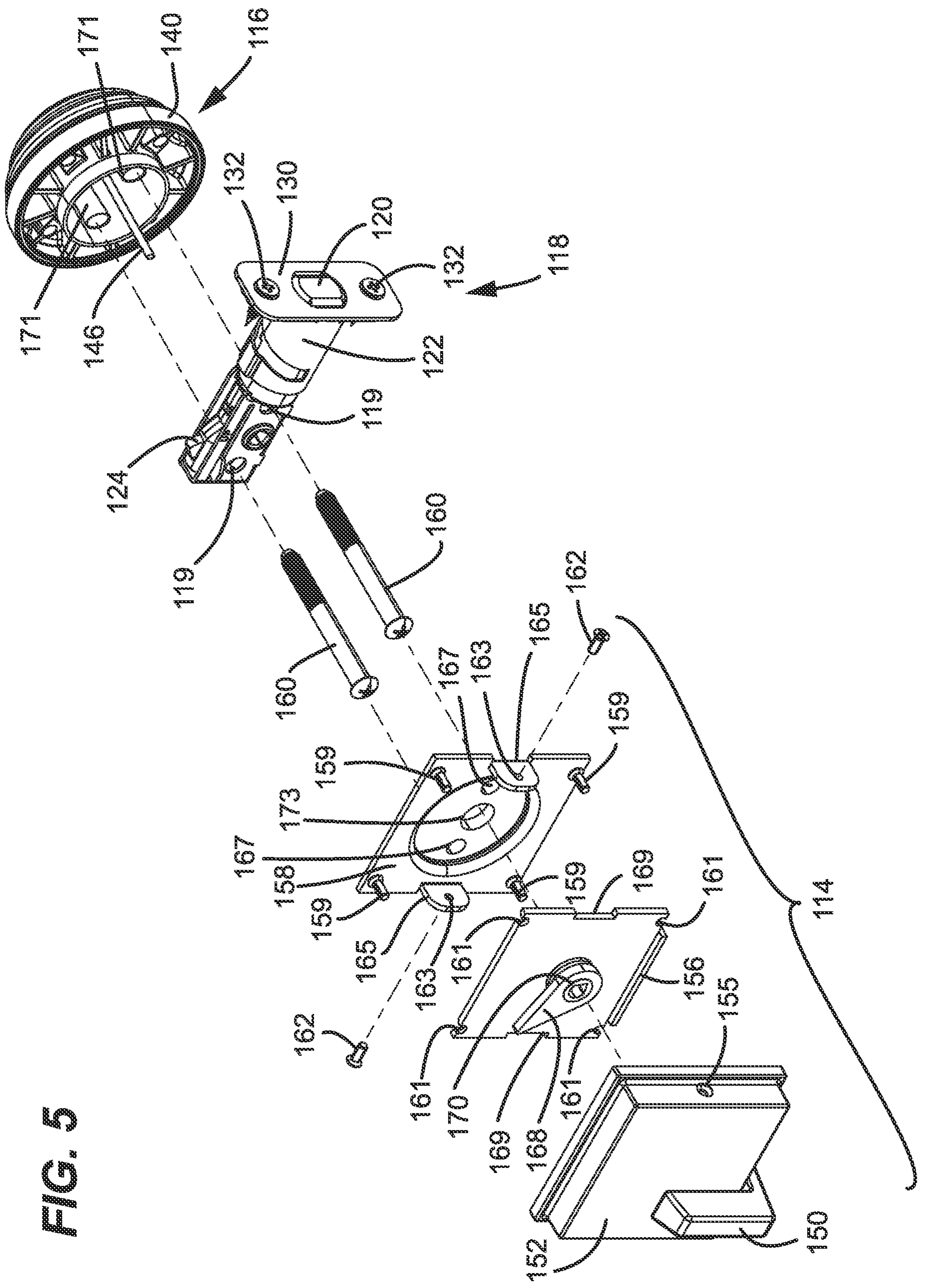
FIG. 5 is an exploded perspective view of the deadbolt of FIG. 1.
Figure 6:
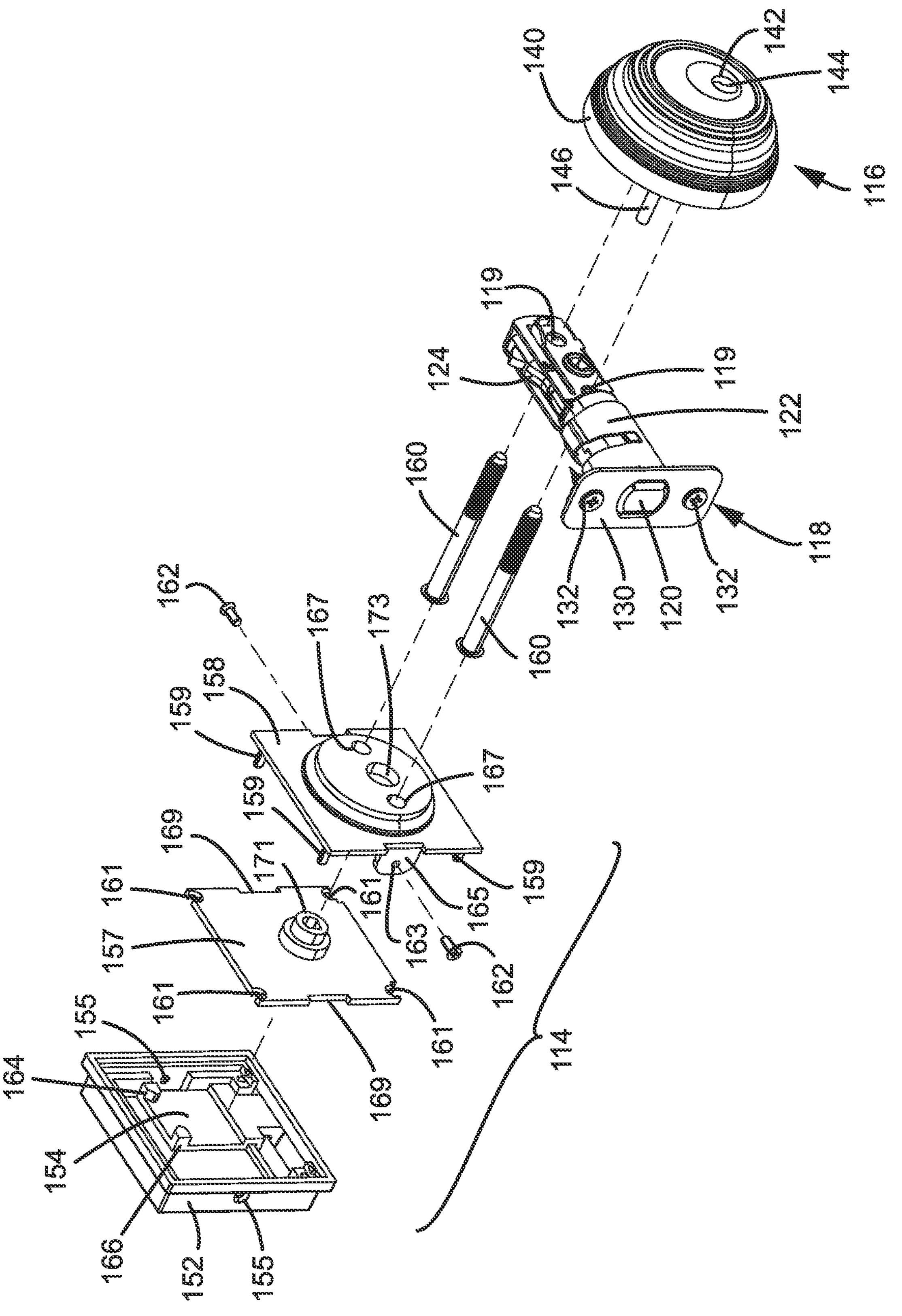
FIG. 6 is another exploded perspective view of the deadbolt of FIG. 1.

FIGS. 1-4 illustrate views of a deadbolt 100 installed on a door 102 according to one example embodiment of the present disclosure. FIGS. 5 and 6 are exploded perspective views of the deadbolt 100.

The door 102 has an interior side 104, an exterior side 106, and a thickness 108 that is transverse with respect to the interior and exterior sides of the door. A horizontal axis 110 is defined along a width of the door 102 and a vertical axis

112 is defined along a height of the door. The horizontal axis 110 and vertical axis 112 are substantially orthogonal to one another.

The deadbolt 100 includes an interior assembly 114, an exterior assembly 116, and a bolt assembly 118. The interior assembly 114 is mounted to the interior side 104 of the door 102. The exterior assembly 116 is mounted to the exterior side 106 of the door 102. The bolt assembly 118 is mounted at least partially in a bore formed inside the door 102 in the thickness 108 that is transverse with respect to the interior and exterior sides 104, 106 of the door.

The term "outside" is broadly used to mean an area outside the door 102 and "inside" is broadly used to denote an area inside the door 102. With an exterior entry door, for example, the exterior assembly 116 when mounted to the door is located outside a building, while the interior assembly 114 is located inside a building. With an interior door, the exterior assembly 116 when mounted to the door is located inside a building, but outside a room accessed by the door, and the interior assembly 114 is located inside the room. The deadbolt 100 can be mounted to both interior and exterior entry doors such that the door 102 can be either type of door.

Figure 2:
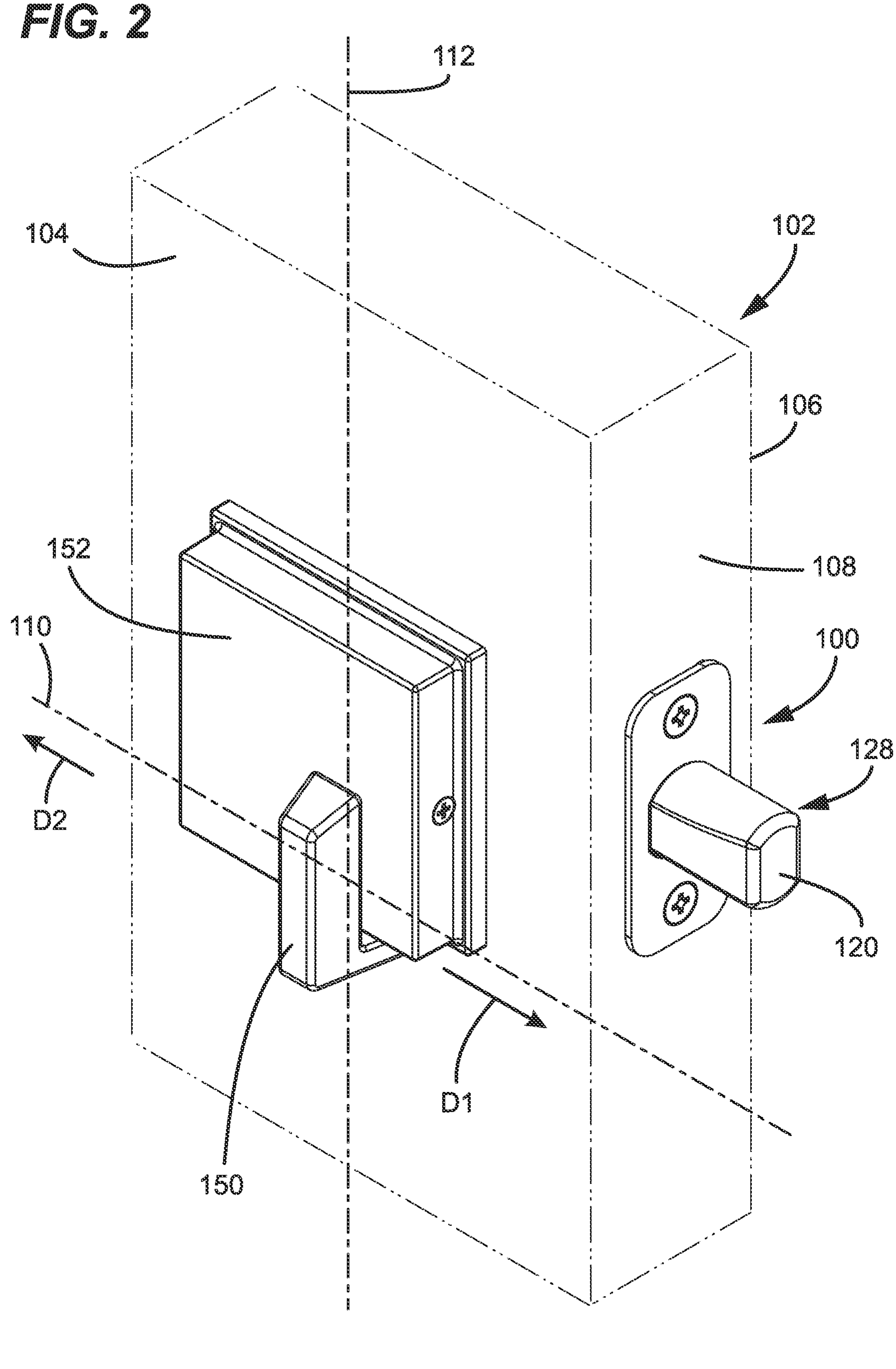
FIG. 2 is another perspective view of the deadbolt of FIG. 1 installed on the interior side of the door, with the deadbolt shown in an extended position.
Figure 3:
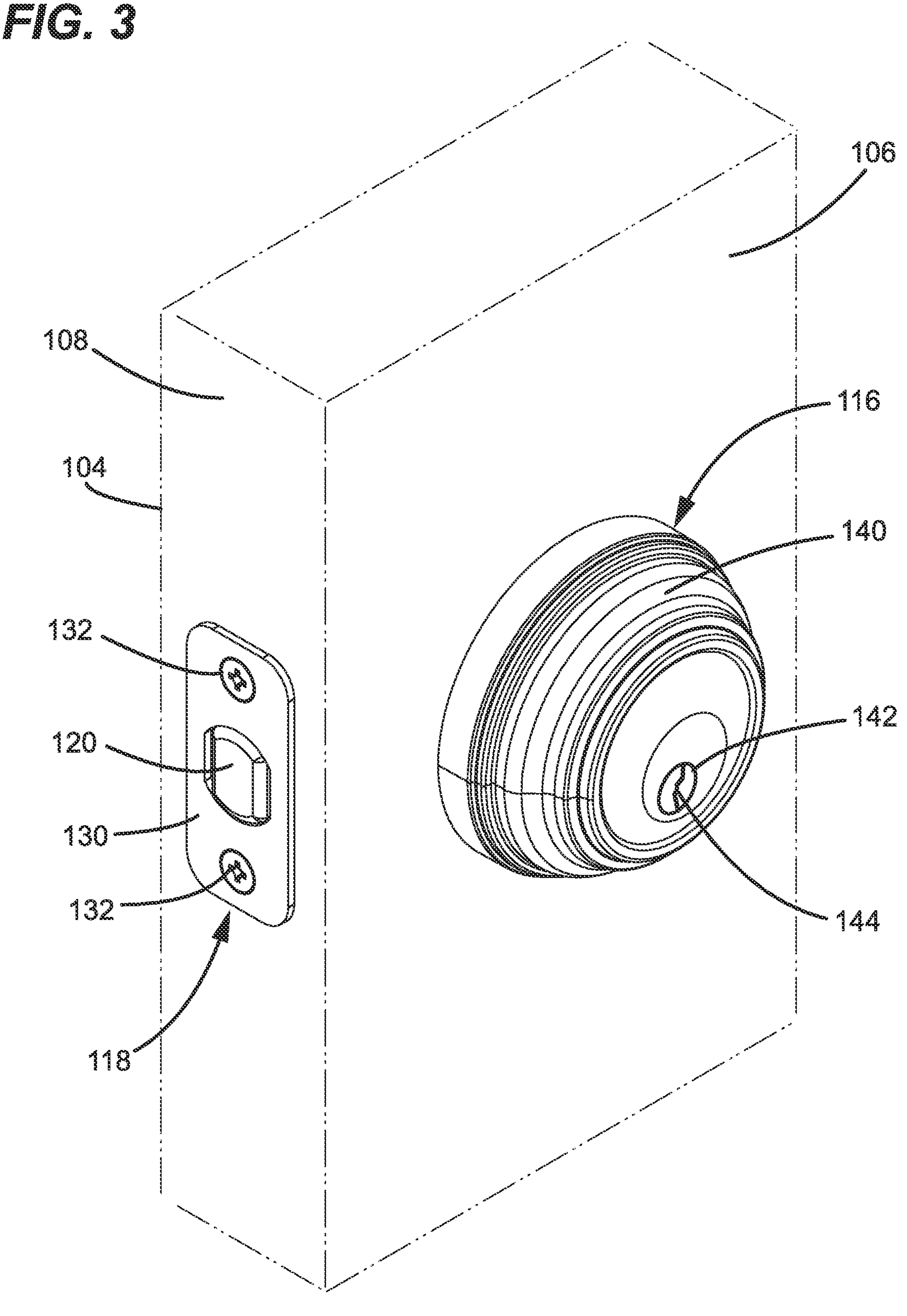
FIG. 3 is a perspective view of the deadbolt of FIG. 1 installed on an exterior side of the door, with the deadbolt shown in the retracted position.
Figure 4:
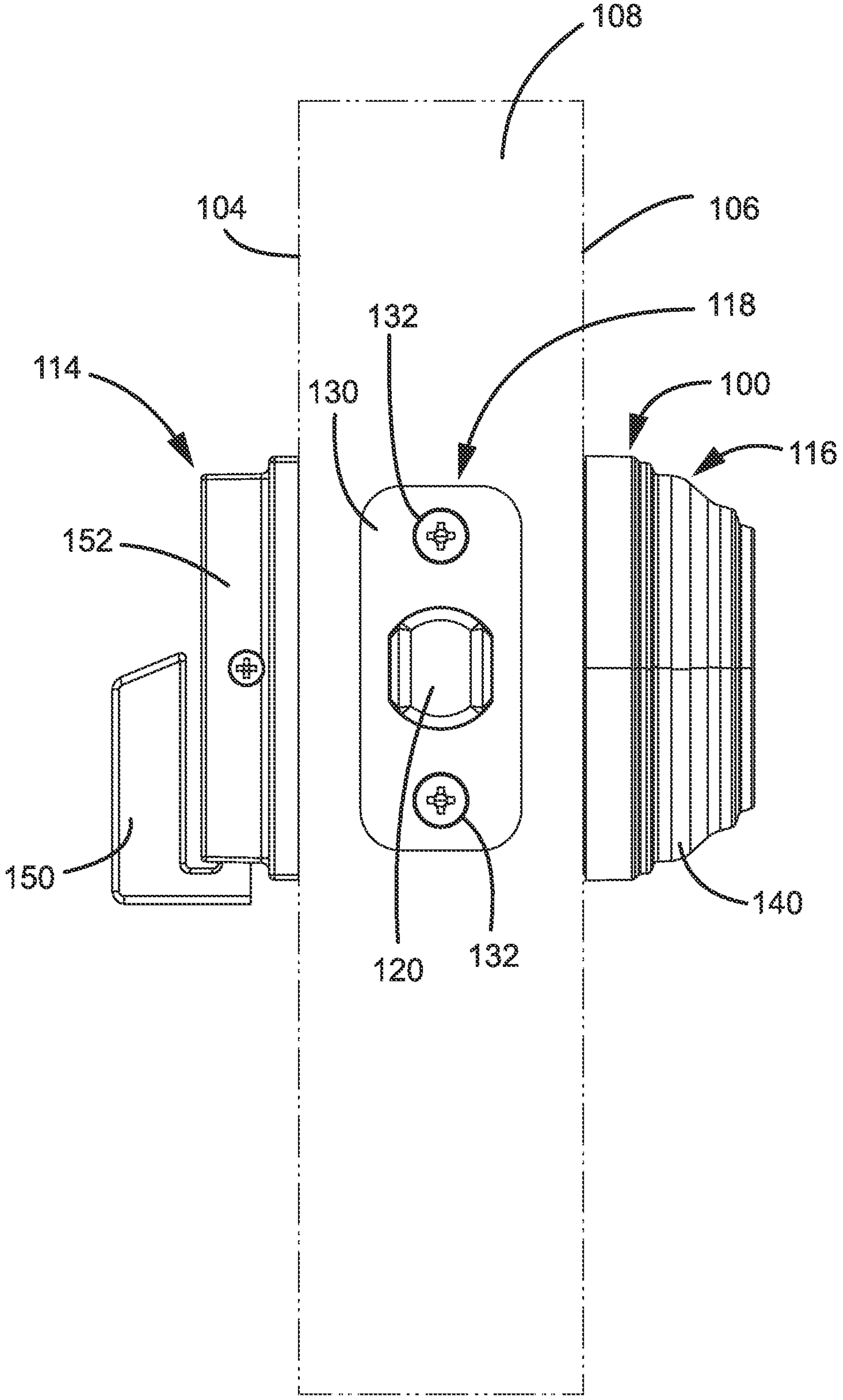
FIG. 4 is a view of the deadbolt of FIG. 1 installed on a side of the door orthogonal to the interior and exterior sides of the door, with the deadbolt shown in the retracted position.

The bolt assembly 118 includes a bolt 120 that is housed inside a deadbolt latch 122. The deadbolt latch 122 includes a cam 124 that can be rotated about an axis orthogonal to the interior and exterior sides 104, 106 of the door 102 to extend and retract the bolt 120. In FIG. 1, the bolt 120 is shown in a retracted position 126. When in the retracted position 126, the door 102 when closed inside a doorframe is unlocked such that the door 102 can be opened relative to the doorframe. In FIG. 2, the bolt 120 is shown in an extended position 128. When in the extended position 128, the door 102 when closed inside a doorframe is locked such that the door 102 cannot be opened relative to the doorframe.

The bolt assembly 118 further includes a faceplate 130 that receives one or more fasteners 132, such as screws, to fix and secure the bolt assembly 118 to the door 102. Additionally, the faceplate 130 protects the area of the door 102 that surrounds the bolt assembly 118 from wear and tear each time the door 102 is opened and closed inside a doorframe.

The exterior assembly 116 is operably connected to the deadbolt latch 122 to move the bolt 120 between the retracted and extended positions 126, 128. The exterior assembly 116 includes a plug 142 housed inside an exterior housing 140. The plug 142 defines a keyhole 144 that is configured to receive a key. When the key is inserted into the keyhole 144, a user is able to rotate the plug 142 in clockwise and counterclockwise directions.

As shown in FIGS. 5 and 6, a tailpiece 146 extends from the plug 142 and engages the cam 124 of the deadbolt latch 122. The tailpiece 146 rotates along with the plug 142 in the clockwise and counterclockwise directions when the key is rotated inside the keyhole 144. The rotation of the tailpiece 146 causes the cam 124 to move the bolt 120 between the retracted and extended positions 126, 128 to lock and unlock the door 102.

The interior assembly 114 includes a manual actuator 150 and a cover plate 152. The manual actuator 150 is a handlebar that slides in a first linear direction D1 along the horizontal axis 110 to move the bolt 120 from the retracted position 126 to the extended position 128. In one embodiment, the first linear direction D1 is from left to right. In another embodiment, the first linear direction D1 is from right to left.

The manual actuator 150 is also operable to slide in a second linear direction D2 along the horizontal axis 110 to move the bolt 120 from the extended position 128 to the retracted position 126. In one embodiment, the second linear direction D2 is from right to left. In another embodiment, the second linear direction D2 is from left to right.

Figure 7:
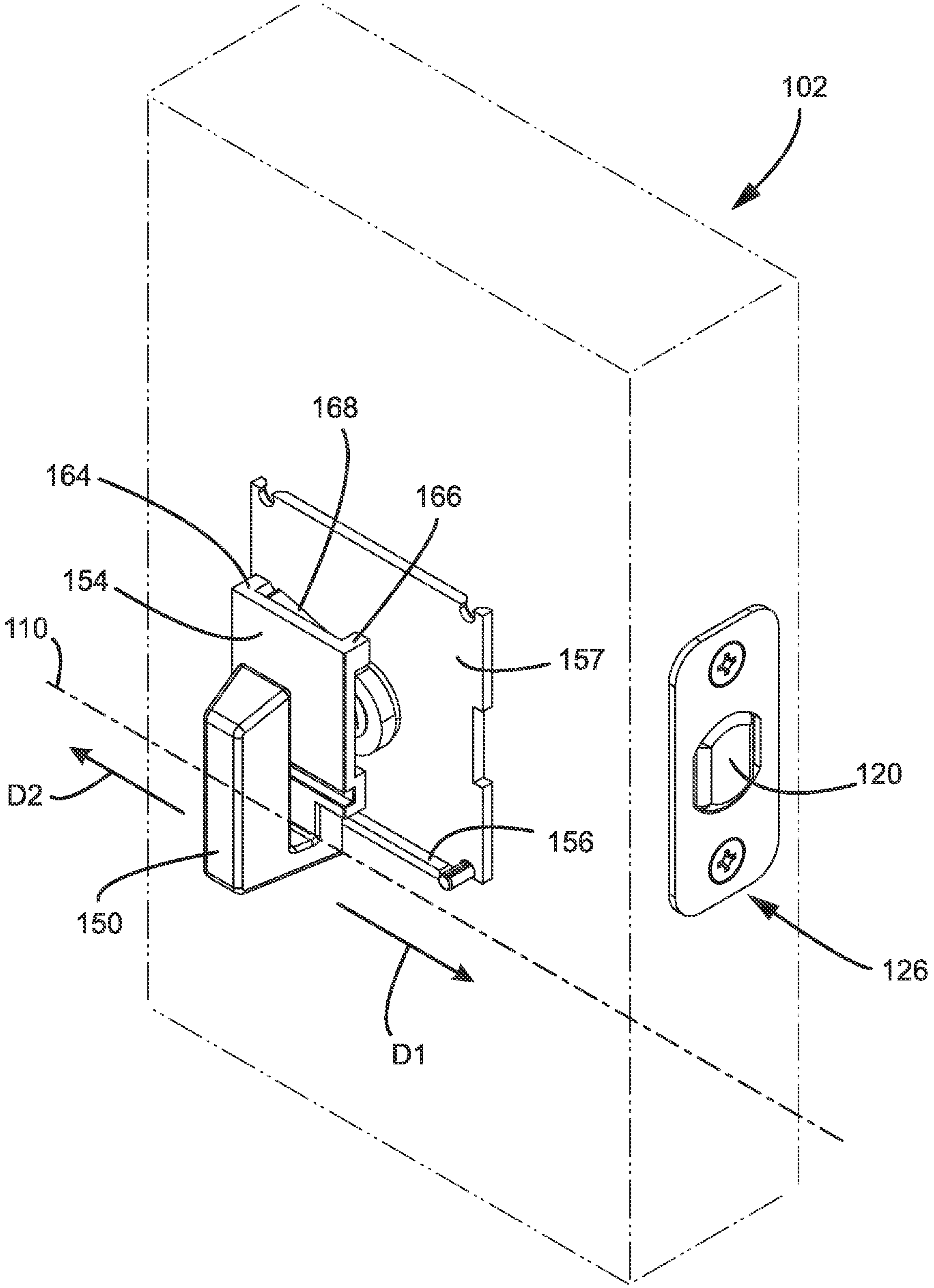
FIG. 7 is a perspective view of the deadbolt of FIG. 1 with a cover plate removed, with the deadbolt shown in the retracted position.
Figure 8:
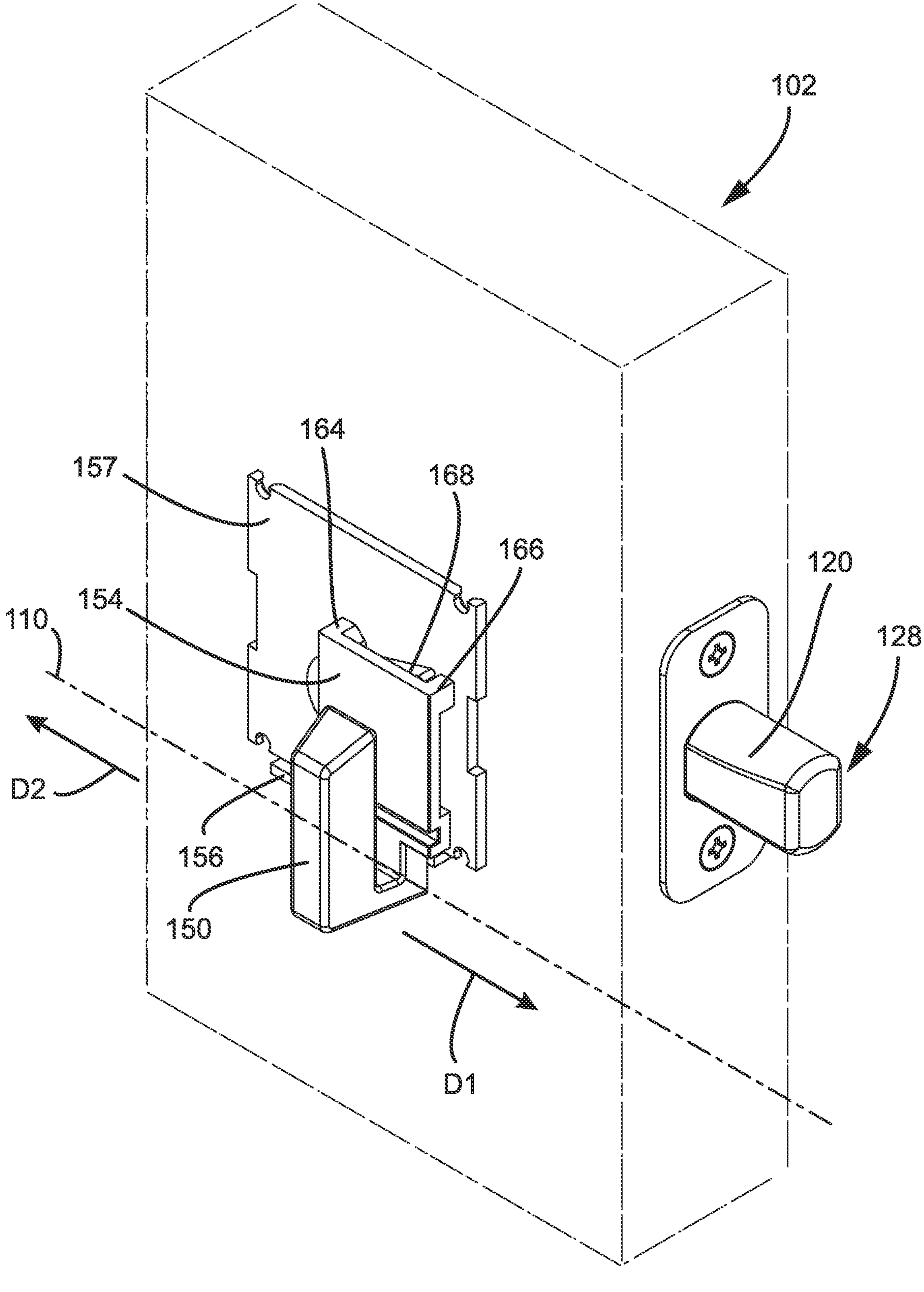
FIG. 8 is a perspective view of the deadbolt of FIG. 1 with the cover plate removed, with the deadbolt shown in the extended position.

FIGS. 7 and 8 are perspective views of the deadbolt 100 with the cover plate 152 removed. In FIG. 7, the bolt 120 is shown in the retracted position 126 while in FIG. 8, the bolt is shown in the extended position 128. Referring now to FIGS. 5-8, the interior assembly 114 further includes a driver 154 that is operably connected to the manual actuator 150 to slide in the first and second linear directions D1, D2. For example, the driver 154 is mounted to slide along a rail 156 on an intermediate plate 157 of the interior assembly 114.

The driver 154 has first and second pivot points 164, 166 that engage a cam 168 as the driver 154 slides along the rail 156 in the first and second linear directions D1, D2. The cam 168 is substantially flush with the intermediate plate 157. When the driver 154 slides in the first linear direction D1 (e.g., from left to right), the first pivot point 164 rotates the cam 168 in a clockwise direction. When the driver 154 slides in the second linear direction D2 (e.g., from right to left), the second pivot point 166 rotates the cam 168 in a counterclockwise direction.

A shown in FIGS. 5 and 6, the cam 168 is connected to a latch shaft 170 that extends through the intermediate plate 157 and an aperture 173 in the attachment plate 158 to engage the cam 124 of the deadbolt latch 122. The latch shaft 170 rotates along with the cam 168 in the clockwise and counterclockwise directions when the cam 168 is rotated inside the interior assembly 114 by the driver 154. Rotation of the latch shaft 170 causes the cam 124 to move the bolt 120 between the retracted and extended positions 126, 128 to lock and unlock the door 102.

The intermediate plate 157 is mounted over an attachment plate 158, and is fixedly positioned relative to the attachment plate 158 inside the interior assembly 114 by one or more grooves 169 that correspond to one or more flanges 165 that extend orthogonally from the attachment plate 158. Additionally, the intermediate plate 157 is fixedly positioned relative to the attachment plate 158 by cutouts 161 at each corner of the intermediate plate 157 that align with dowels 159 that extend orthogonally from each corner of the attachment plate 158.

The attachment plate 158 attaches to the interior side 104 of the door 102 by elongated fasteners 160 such as screws that are threaded through holes 167 of the attachment plate 158, and through corresponding holes 119 in the bolt assembly 118 and into fastener receiving apertures 171 in the exterior assembly 116. Thus, the elongated fasteners 160 fixedly secure the interior assembly 114, bolt assembly 118, and exterior assembly 116 to the door 102.

The cover plate 152 includes holes 155 that align with corresponding holes 163 on the flanges 165 that extend orthogonally from the attachment plate 158. Fasteners 162 such as screws are threaded through the holes 155, 163 to secure the cover plate 152 to the attachment plate 158 on the interior side 104 of the door 102.

Figure 9:
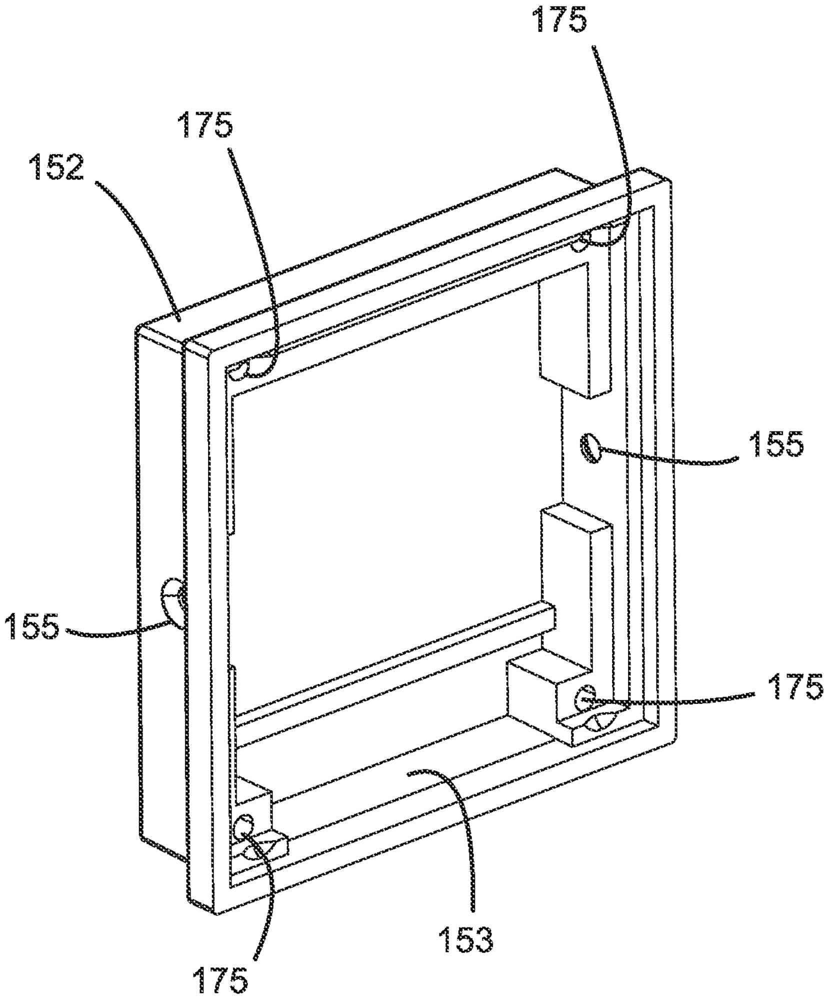
FIG. 9 is a perspective view of an interior of the cover plate.
Figure 10:
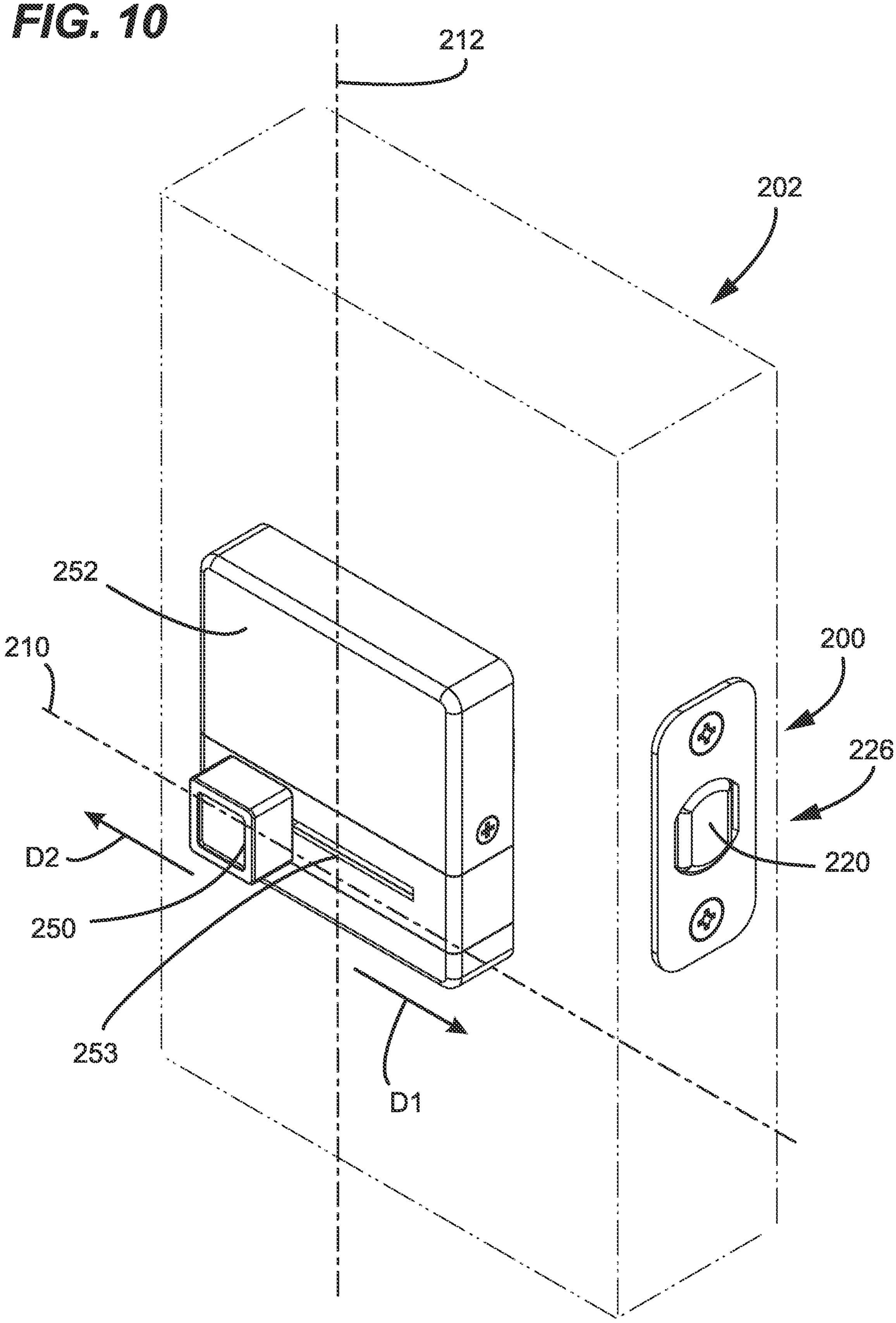
FIG. 10 is a perspective view of a deadbolt installed on an interior side of a door according to another embodiment, with the deadbolt shown in a retracted position.
Figure 11:
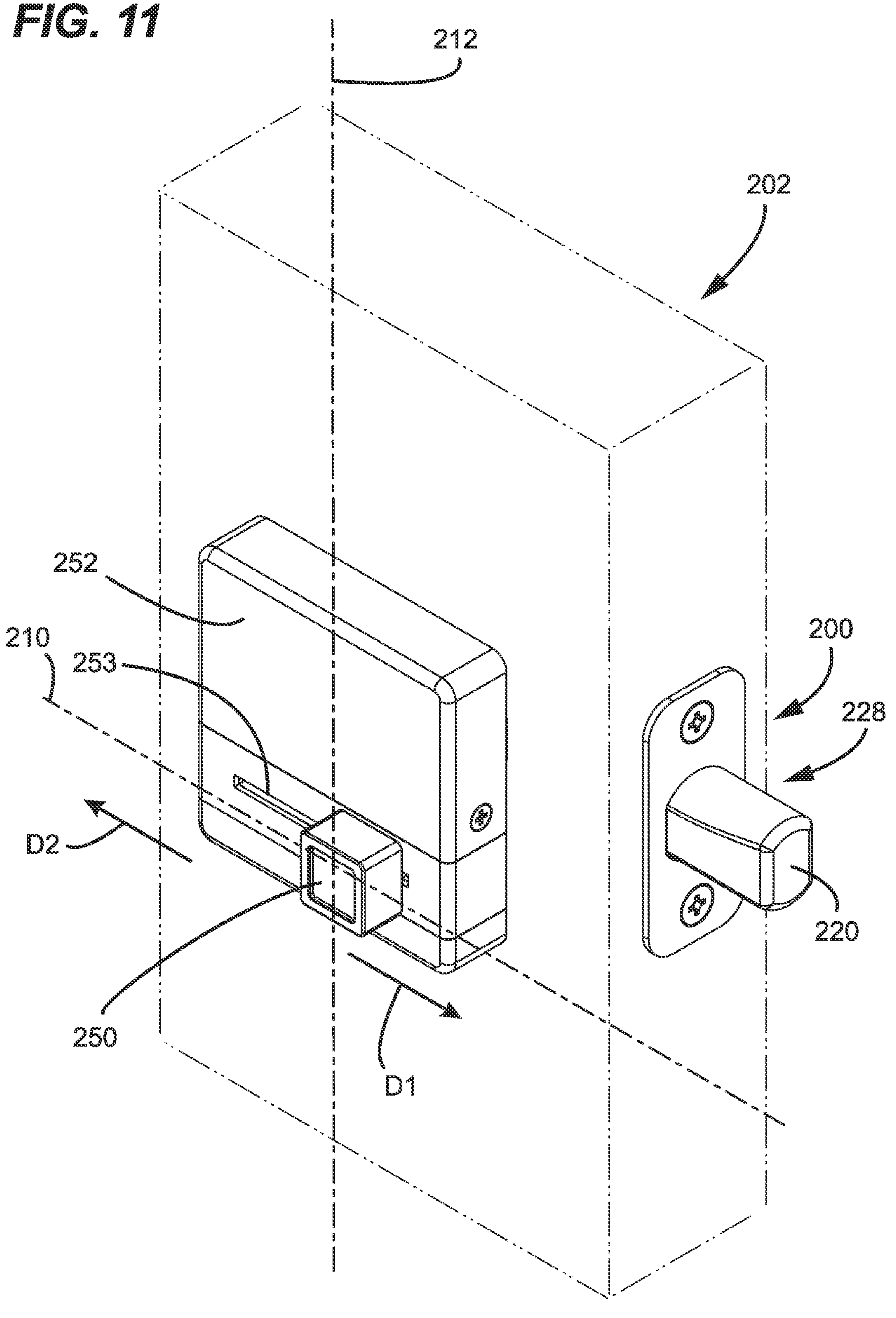
FIG. 11 is another perspective view of the deadbolt of FIG. 10 installed on the interior side of the door, with the deadbolt shown in an extended position.

FIG. 9 is a perspective view of an interior of the cover plate 152. The cover plate 152 has a slot 153 that allows the manual actuator 150 to slide in the first and second linear directions D1, D2 along the rail 156 of the intermediate plate 157. Additionally, the cover plate 152 can include apertures 175 that align with the dowels 159 of the attachment plate 158 to secure the cover plate 152 to the attachment plate 158.

FIGS. 10-15 are perspective and exploded views of a deadbolt 200 installed on a door 202 according to another example embodiment of the present disclosure. The deadbolt 200 includes an interior assembly 214, an exterior assembly 216, and a bolt assembly 218. The exterior assembly 216 and bolt assembly 218 are substantially the same as the exterior assembly 116 and bolt assembly 118 described above with respect to the deadbolt 100.

Also, like in the deadbolt 100, the interior assembly 214 includes a manual actuator 250 that slides in first and second linear directions D1, D2 along a horizontal axis 210 to move a bolt 220 back and forth between a retracted position 226 an extended position 228. A vertical axis 212 is defined along a height of the door 202. The horizontal axis 210 and vertical axis 212 are substantially orthogonal to one another.

The interior assembly 214 has a cover plate 252 with a slot 253 on a front surface that allows the manual actuator 250 to slide in the first and second linear directions D1, D2 along the slot 253 of the cover plate 252. Also, in this embodiment, the manual actuator 250 is a knob.

Figure 12:
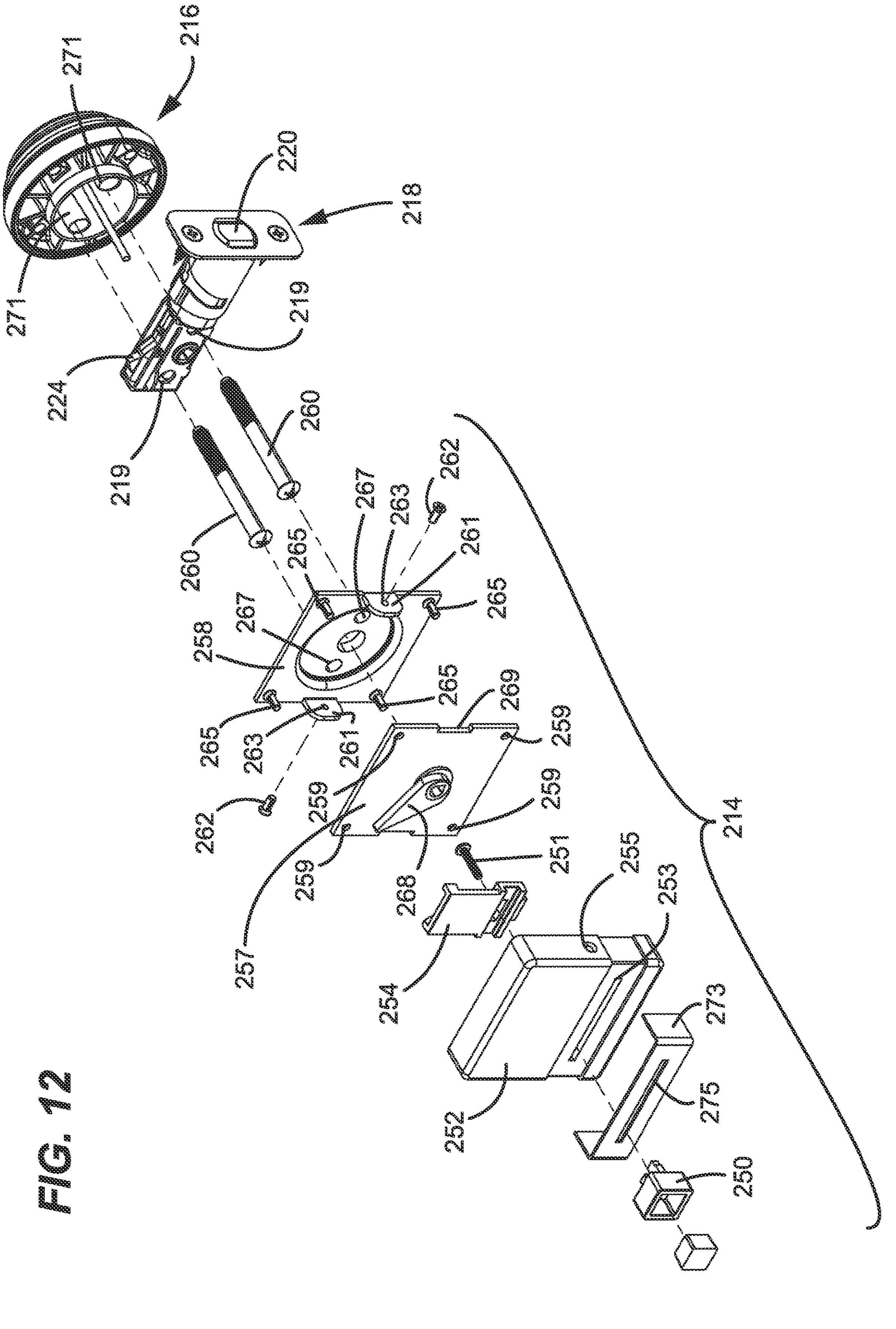
FIG. 12 is an exploded perspective view of the deadbolt of FIG. 10.
Figure 13:
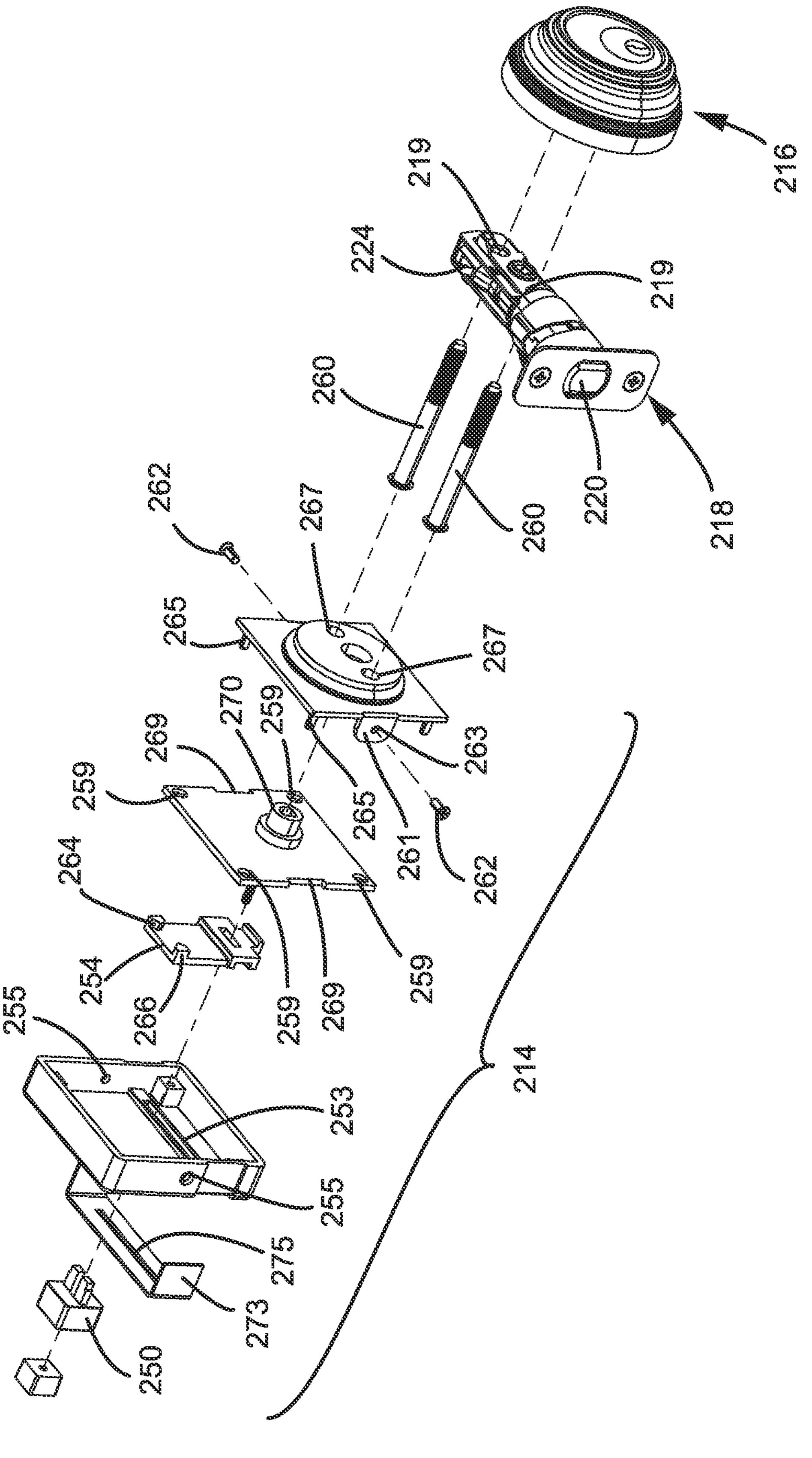
FIG. 13 is another exploded perspective view of the deadbolt of FIG. 10.

Referring now to FIGS. 12 and 13, an attachment plate 258 attaches to the interior side of the door 202 by elongated fasteners 260 that are threaded through holes 267 of the attachment plate 258, and through corresponding holes 219 in the bolt assembly 218 and into fastener receiving apertures 271 in the exterior assembly 216. Thus, the elongated fasteners 260 fixedly secure the interior assembly 214, bolt assembly 218, and exterior assembly 216 to the door 202.

An intermediate plate 257 is mounted over the attachment plate 258. In some embodiments, the intermediate plate 257 is fixedly positioned relative to the attachment plate 258 inside the interior assembly 214 by one or more grooves 269 that correspond to one or more flanges 261 that extend orthogonally from the attachment plate 258. Also, the intermediate plate 257 is fixedly positioned relative to the attachment plate 258 by holes 259 in the intermediate plate 257 that align with dowels 265 that extend orthogonally from the attachment plate 258.

The cover plate 252 includes holes 255 that align with corresponding holes 263 positioned on flanges 261 that extend orthogonally from the attachment plate 258. Fasteners 262 such as screws are threaded through the holes 255, 263 to secure the cover plate 252 to the attachment plate 258 on the interior side of the door 202. Additionally, a fastener 251 fixedly secures the manual actuator 250 to a driver 254.

A strip 273 is mounted to the cover plate 252 and includes a slot 275 that corresponds with the slot 253 of the cover plate 252. The strip 273 can enhance the slidability of the manual actuator 250 by providing a smooth surface on which the manual actuator 250 can slide. Additionally, the strip 273 can enhance the aesthetic appearance of the deadbolt 200. The strip 273 can attach to the cover plate 252 by an adhesive or other type of similar fastening mechanism.

Figure 14:
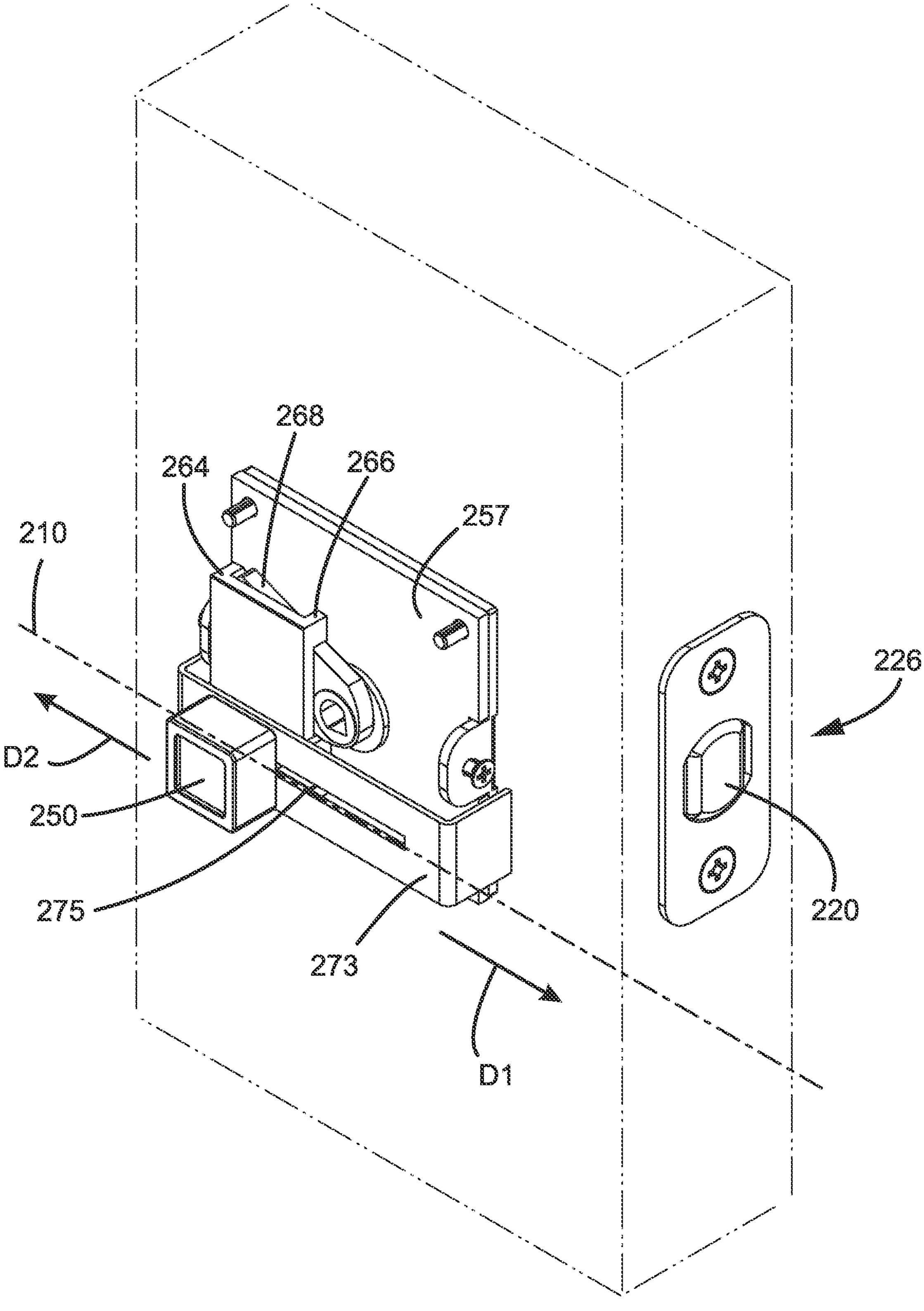
FIG. 14 is a perspective view of the deadbolt of FIG. 10 with a cover plate removed, with the deadbolt shown in the retracted position.
Figure 15:
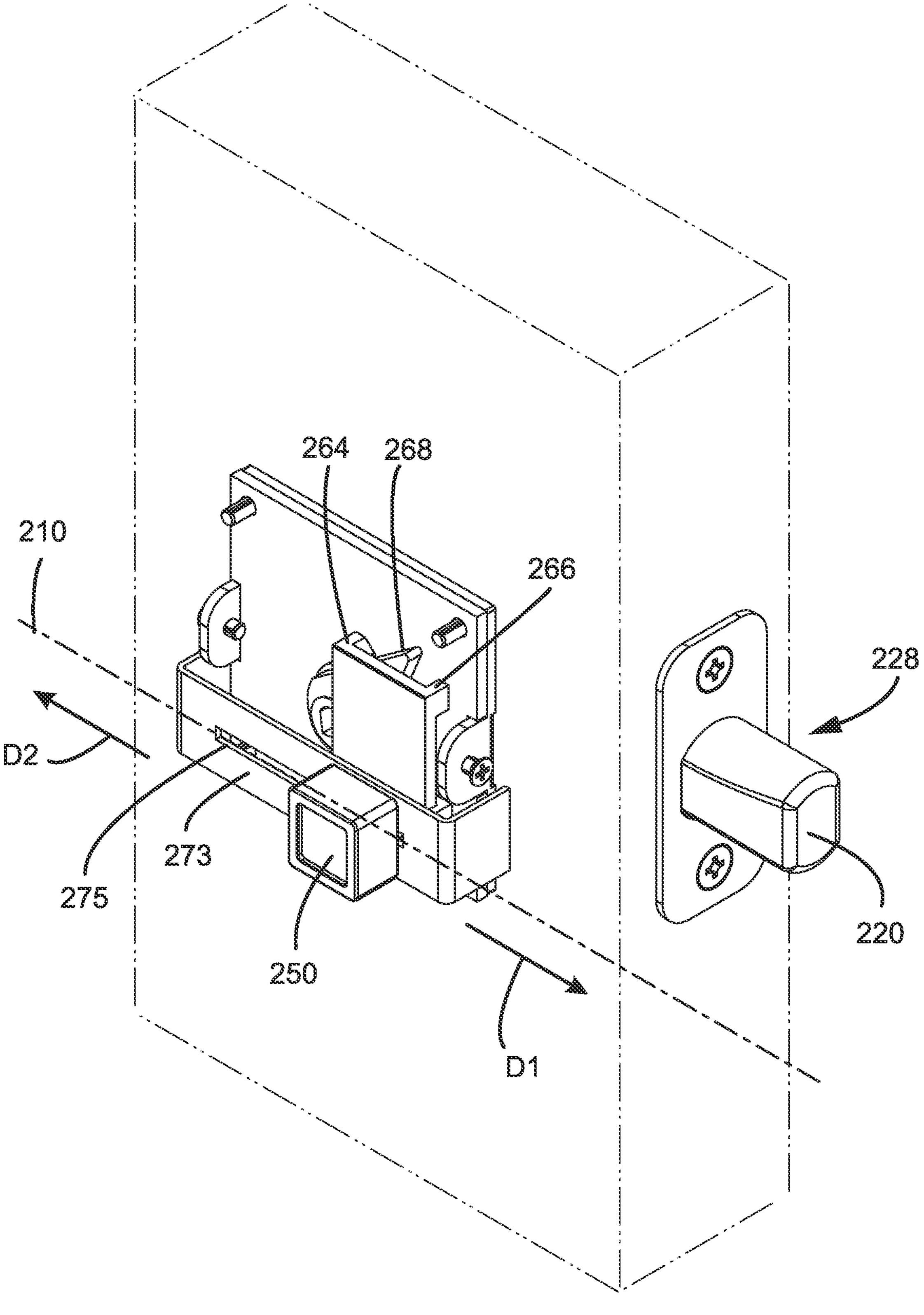
FIG. 15 is a perspective view of the deadbolt of FIG. 10 with the cover plate removed, with the deadbolt shown in the extended position.

FIGS. 14 and 15 are perspective views of the deadbolt 200 with the cover plate 252 removed. In FIG. 14, the bolt 220 is shown in the retracted position 226 while in FIG. 15, the bolt is shown in the extended position 228. Referring now to FIGS. 12-15, the driver 254 is connected to the manual actuator 250 to slide in the first and second linear directions D1, D2. The driver 254 is mounted to slide along the slot 253 of the cover plate 252 of the interior assembly 214.

The driver 254 has first and second pivot points 264, 266 that engage a cam 268 as the driver 254 slides along the slot 253 in the first and second linear directions D1, D2. The cam 268 is substantially flush with the intermediate plate 257. When the driver 254 slides in the first linear direction D1 (e.g., from left to right), the first pivot point 264 rotates the cam 268 in a clockwise direction. When the driver 254 slides in the second linear direction D2 (e.g., from right to left), the second pivot point 266 rotates the cam 268 in a counterclockwise direction.

The cam 268 is connected to a latch shaft 270 that extends through the intermediate plate 257 and the attachment plate 258, and that engages a cam 224 of the bolt assembly 218. The latch shaft 270 rotates along with the cam 268 in the clockwise and counterclockwise directions when the cam 268 is rotated inside the interior assembly 214 by the driver 254 fixedly attached to the manual actuator 250. The rotation of the latch shaft 270 causes the cam 224 to move the bolt 220 between the retracted and extended positions 226, 228 to lock and unlock the door 202.

Figure 16:
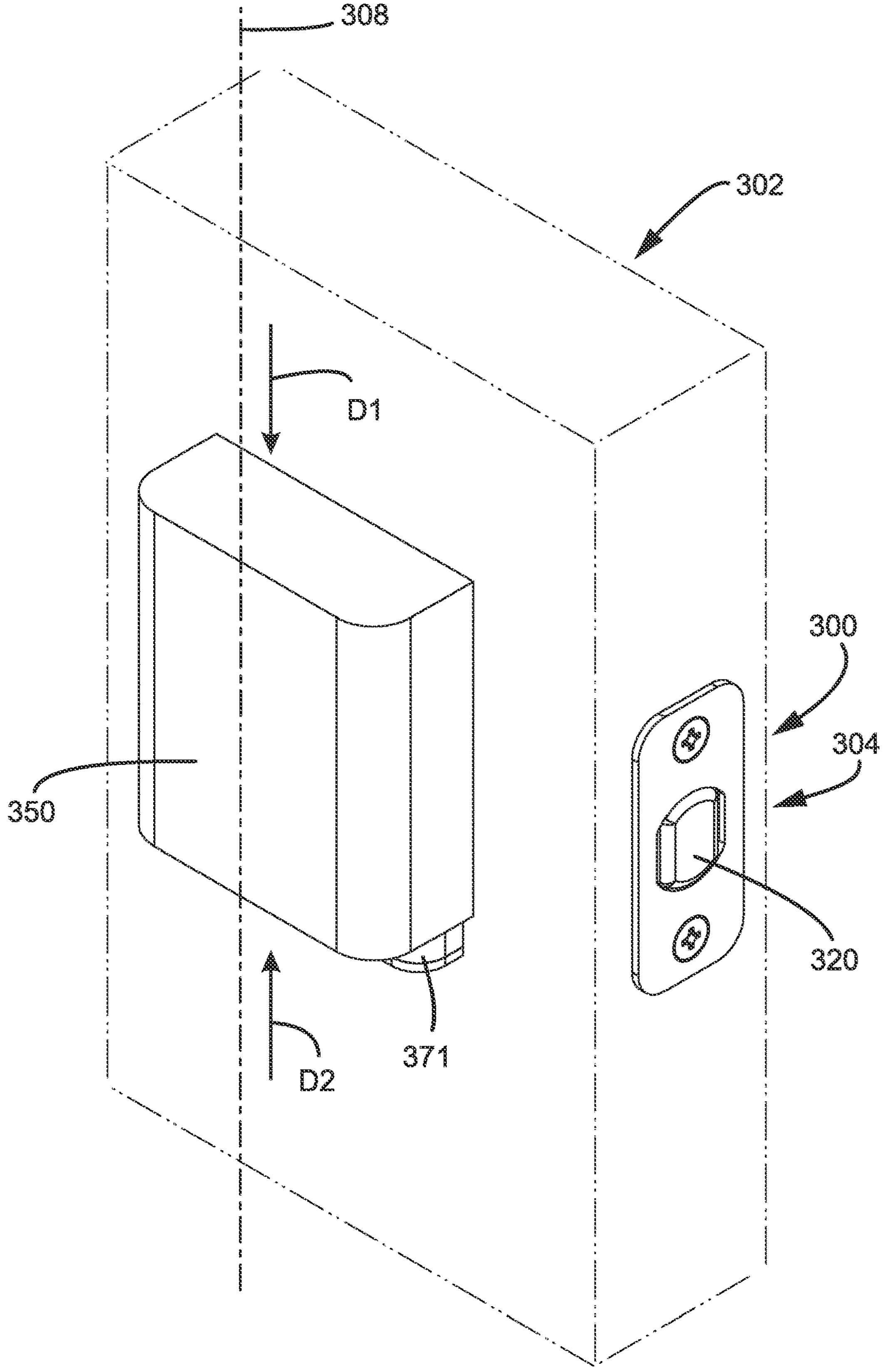
FIG. 16 is a perspective view of a deadbolt installed on an interior side of a door according to another embodiment, with the deadbolt shown in a retracted position.
Figure 17:
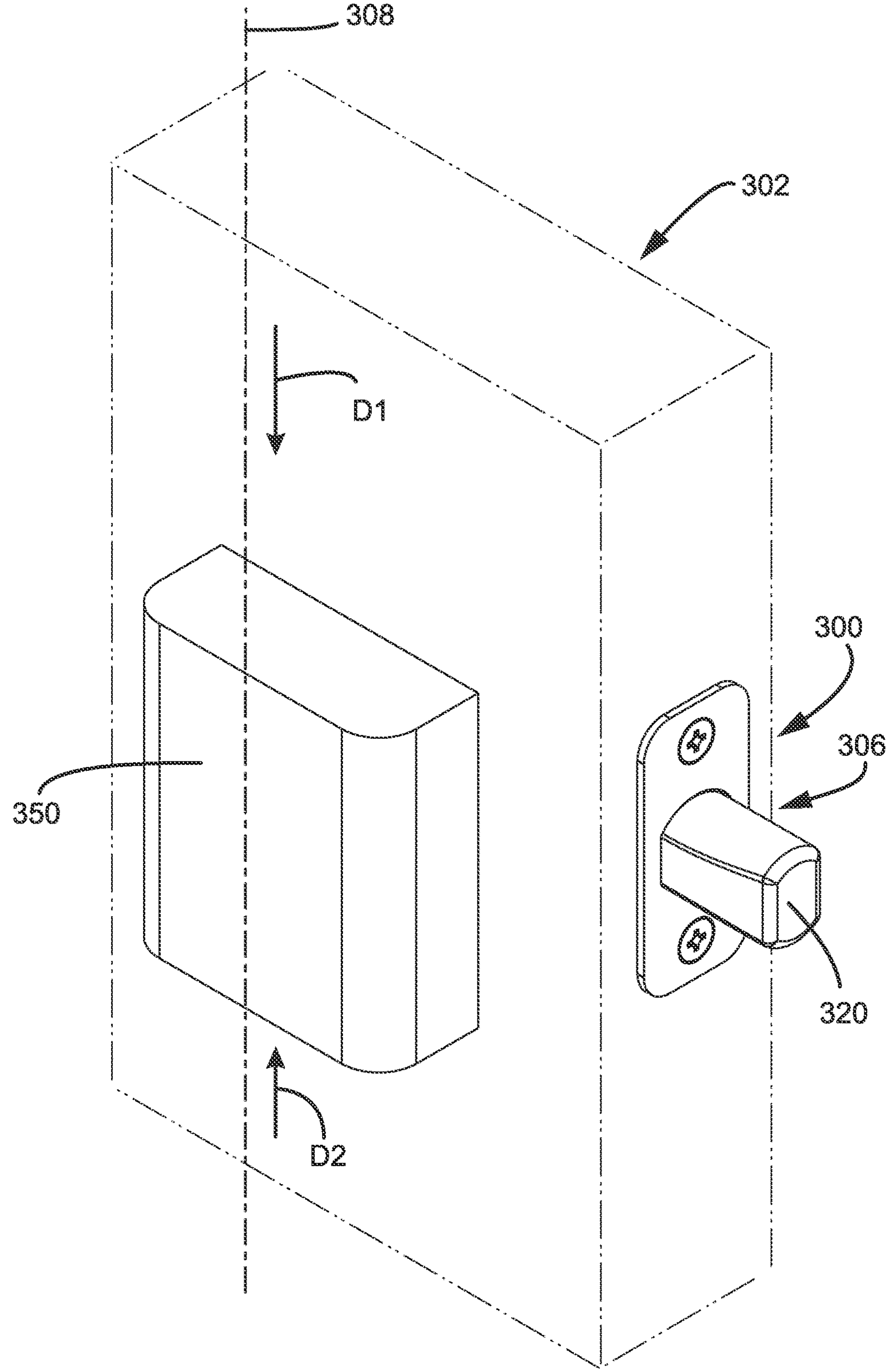
FIG. 17 is another perspective view of the deadbolt of FIG. 16 installed on the interior side of the door, with the deadbolt shown in an extended position.

FIGS. 16 and 17 are perspective and exploded views of a deadbolt 300 installed on an interior side of a door 302 according to another embodiment of the present disclosure. In FIG. 16, the deadbolt 300 includes a bolt 320 that is shown in a retracted position 304. In FIG. 17, the bolt 320 is shown in an extended position 306. The deadbolt 300 includes a manual actuator 350 that is operable to slide in first and second linear directions D1, D2 along a vertical axis 308 to move the bolt 320 between the retracted position 304 and extended position 306.

The manual actuator 350 is also operable to slide in the first linear direction D1 along the vertical axis 308 to move the bolt 320 from the retracted position 304 to the extended position 306. In the embodiment depicted in FIGS. 16 and 17, the first linear direction D1 is from up to down. In alternative embodiments, the first linear direction D1 is from down to up.

The manual actuator 350 is also operable to slide in a second linear direction D2 along the vertical axis 308 to move the bolt 320 from the extended position 306 to the retracted position 304. In the embodiment illustrated in FIGS. 16 and 17, the second linear direction D2 is from down to up. In alternative embodiments, the second linear direction D2 is from up to down.

Figure 18:
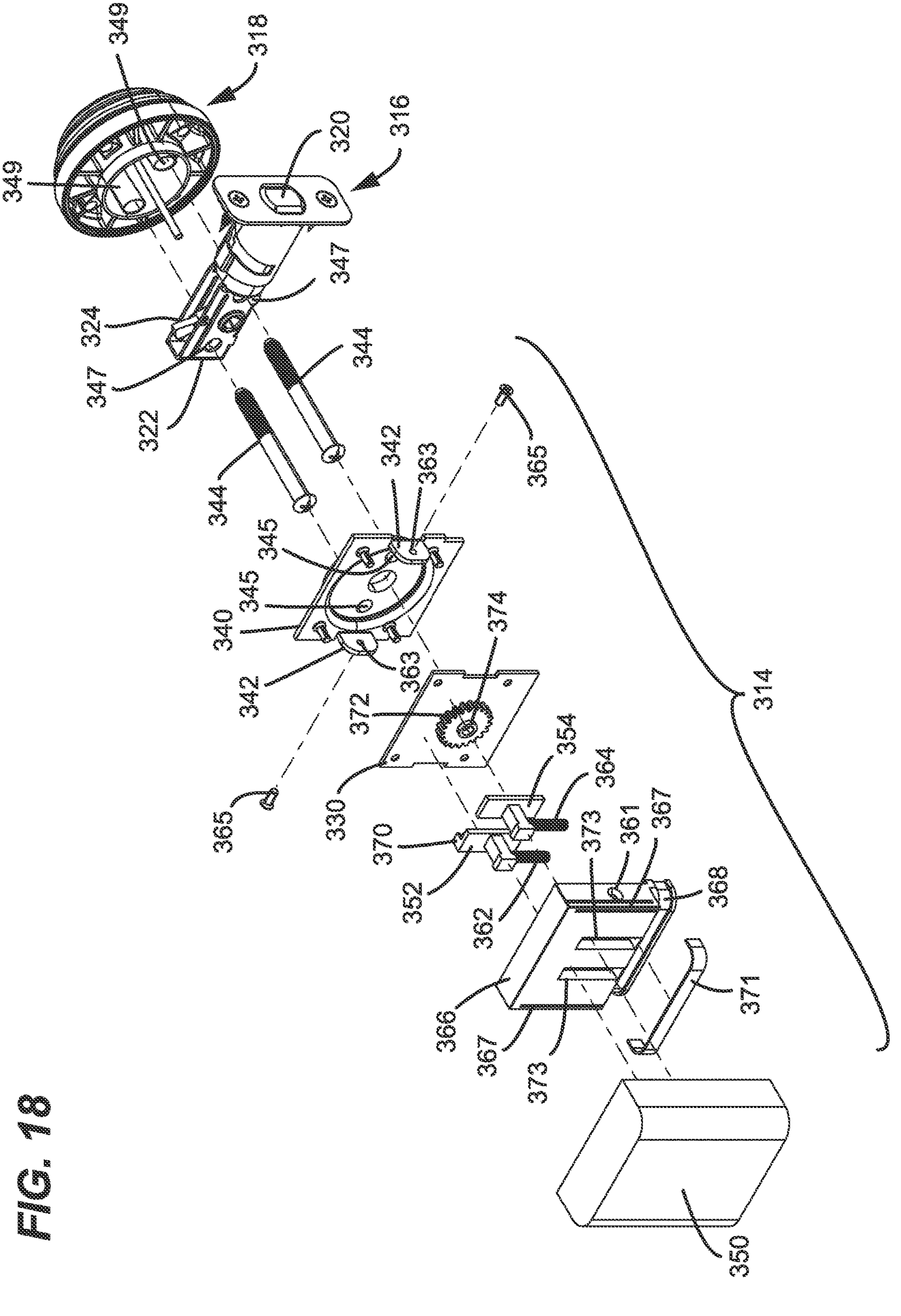
FIG. 18 is an exploded perspective view of the deadbolt of FIG. 16.
Figure 19:
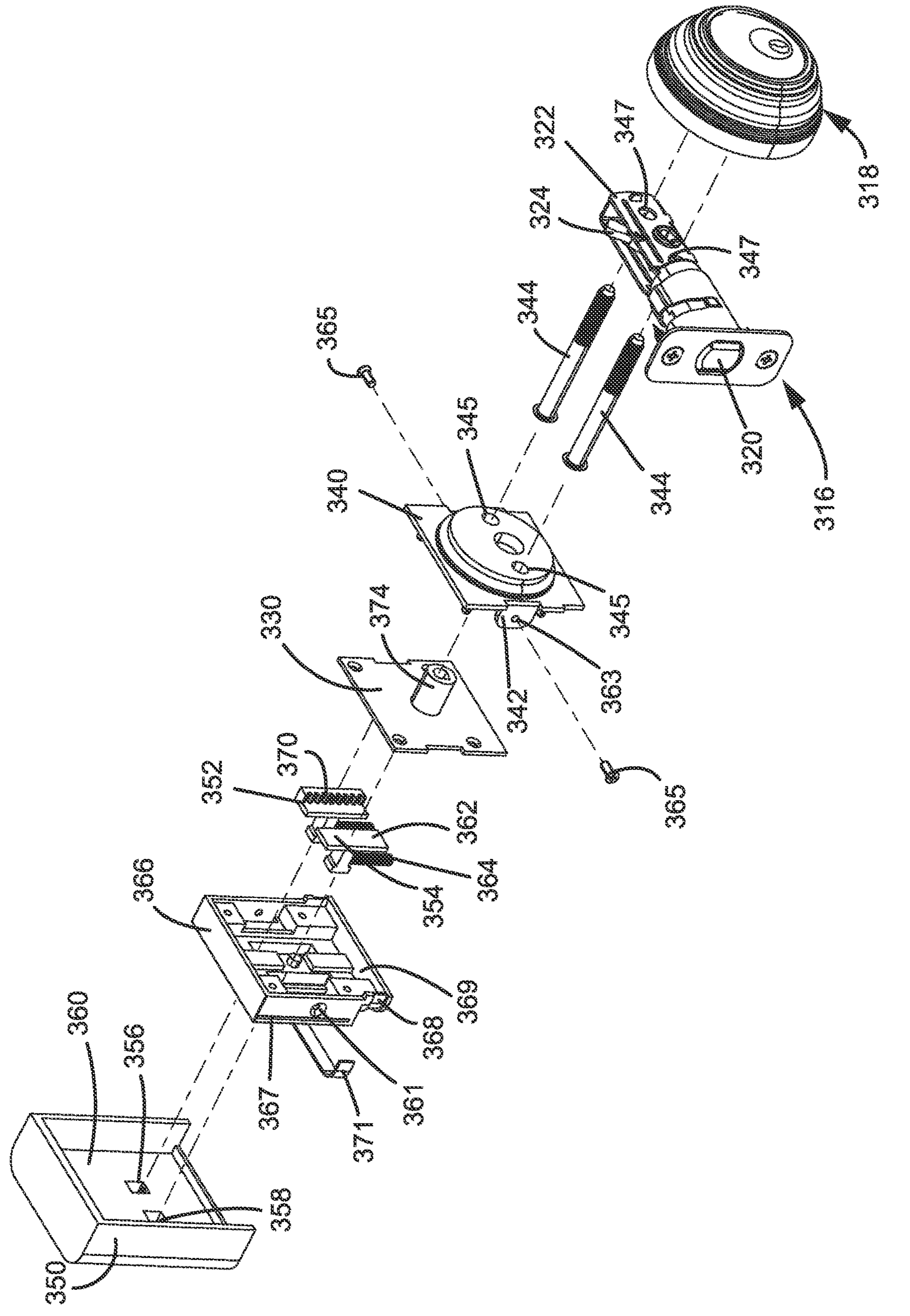
FIG. 19 is another exploded perspective view of the deadbolt of FIG. 16.

FIGS. 18 and 19 are exploded views of the deadbolt 300. The deadbolt 300 includes an interior assembly 314, a bolt assembly 316, and an exterior assembly 318. The bolt assembly 316 and exterior assembly 318 are substantially similar as the exterior assembly 116 and bolt assembly 118 described above with respect to the deadbolt 100.

The interior assembly 314 includes the manual actuator 350 mounted over a housing 366. The manual actuator 350, in addition to being operable to move the bolt 320 between the retracted and extended positions 304, 306, can also advantageously cover the housing 366 and the other internal components of the interior assembly 314.

The housing 366 is nested inside the manual actuator 350 such that the manual actuator 350 slides relative to the housing 366. The housing 366 has rails 367 on opposite sides, and the manual actuator 350 slides along the rails 367 in the first and second linear directions D1, D2.

The housing 366 includes a bottom portion 368. In some embodiments, the bottom portion 368 can include a display 371 that is viewable when the manual actuator 350 is in the retracted position and that is covered by the manual actuator 350 when the manual actuator is in the extended position. The display 371 can attach to the bottom portion 368 by an adhesive such as glue or tape. Alternatively, the display 371 can be painted onto the bottom portion 368.

In some embodiments, the display 371 indicates that the bolt 320 is in the retracted position 304 such that the door 302 is unlocked. For example, the display 371 can be colored green to indicate that the door 302 is unlocked. In alternative embodiments, the display 371 indicates that the bolt 320 is in the extended position 306 such that the door 302 is locked. For example, the display 371 can be colored red to indicate that the door 302 is locked.

The housing 366 includes slots 373 that receive first and second drivers 352, 354. The slots 373 are spaced apart from one another and are substantially parallel. The first and second drivers 352, 354 attach to first and second sockets 356, 358 on an interior surface 360 of the manual actuator 350. The first and second drivers 352, 354 are fixed to the manual actuator 350 such that the first and second drivers 352, 354 move in the first and second linear directions D1, D2 along with the manual actuator 350 when operated by a user. The first and second drivers 352, 354 fix the manual actuator 350 to the housing 366 in a plane orthogonal to a front surface of the housing 366 such that the manual actuator 350 cannot be pulled off of the housing 366.

First and second setscrews 362, 364 are positioned under the first and second drivers 352, 354, respectively, and engage an internal surface 369 on the bottom portion 368 of the housing 366. As shown in FIG. 19, the first driver 352 includes a linear gear 370. The second driver 354 does not include a linear gear. In an alternative embodiment, the second driver 354 can include the linear gear 370 while the first driver 352 does not includes a linear gear.

As shown in FIG. 18, a circular gear 372 is engaged by the linear gear 370 to rotate in clockwise and counterclockwise directions when the manual actuator 350 slides in the first and second linear directions D1, D2 along the rails 367 on housing 366. In certain examples, the circular gear 372 and linear gear 370 are a rack and pinion gear assembly.

An intermediate plate 330 is mounted over an attachment plate 340. The intermediate plate 330 and attachment plate 340 are substantially similar to the attachment plate 258 and the intermediate plate 257 described above with respect to the deadbolt 200.

The attachment plate 340 attaches to the interior side of the door 302 by elongated fasteners 344 such as screws that are threaded through holes 345 in the attachment plate 340, and through corresponding holes 347 in the bolt assembly 316 and into fastener receiving apertures 349 in the exterior assembly 318. Accordingly, the elongated fasteners 344 fixedly secure the deadbolt 300 to the door 302.

As shown in FIGS. 18 and 19, the housing 366 includes holes 361 that align with corresponding holes 363 on flanges 342 that extend orthogonally from the attachment plate 340. Fasteners 365 such as screws are threaded through the holes 361, 363 to secure the housing 366 to the attachment plate 340 on the interior side of the door 302.

Figure 20:
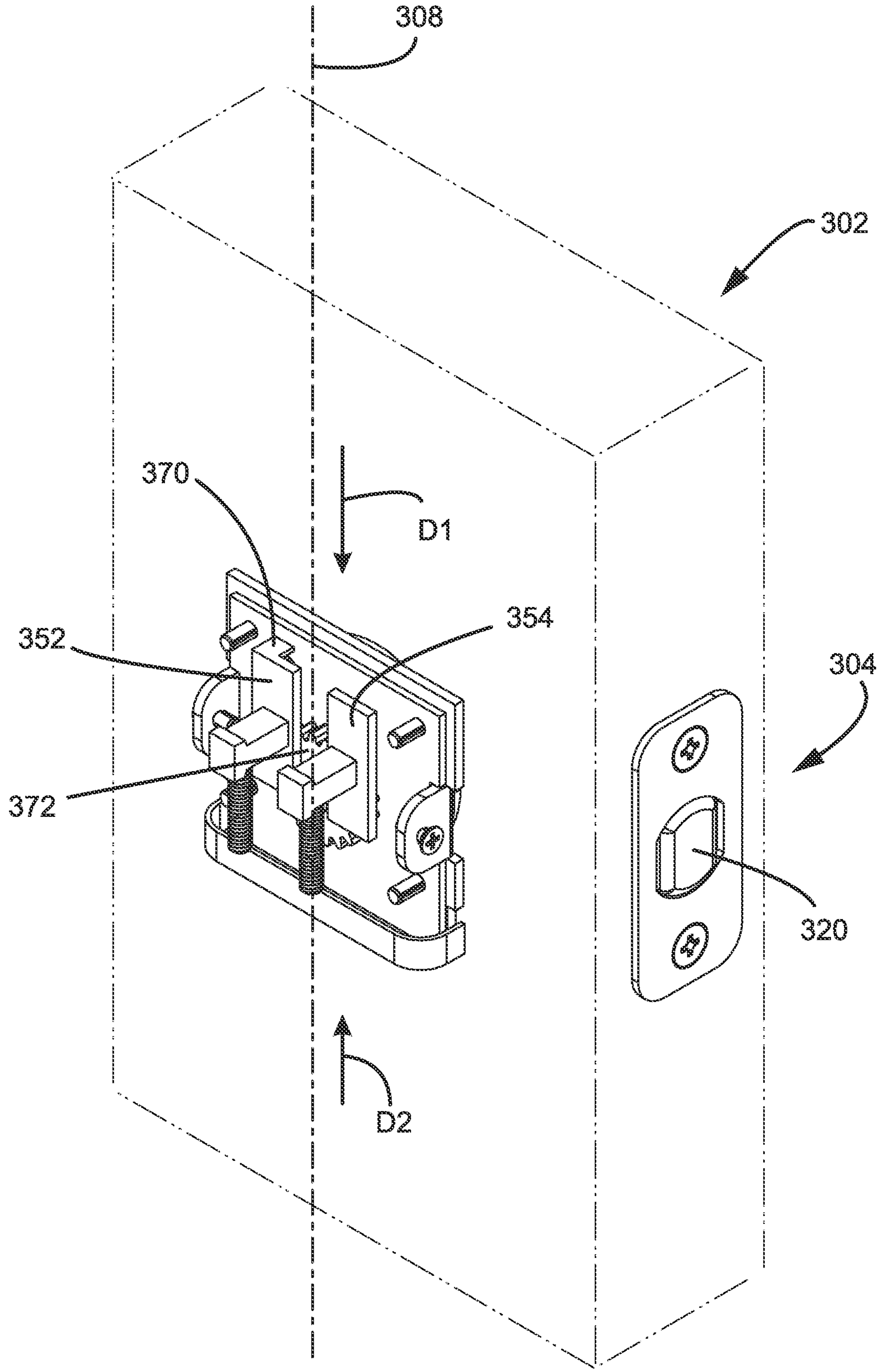
FIG. 20 is a perspective view of the deadbolt of FIG. 16 with a cover plate removed, with the deadbolt shown in the retracted position.
Figure 21:
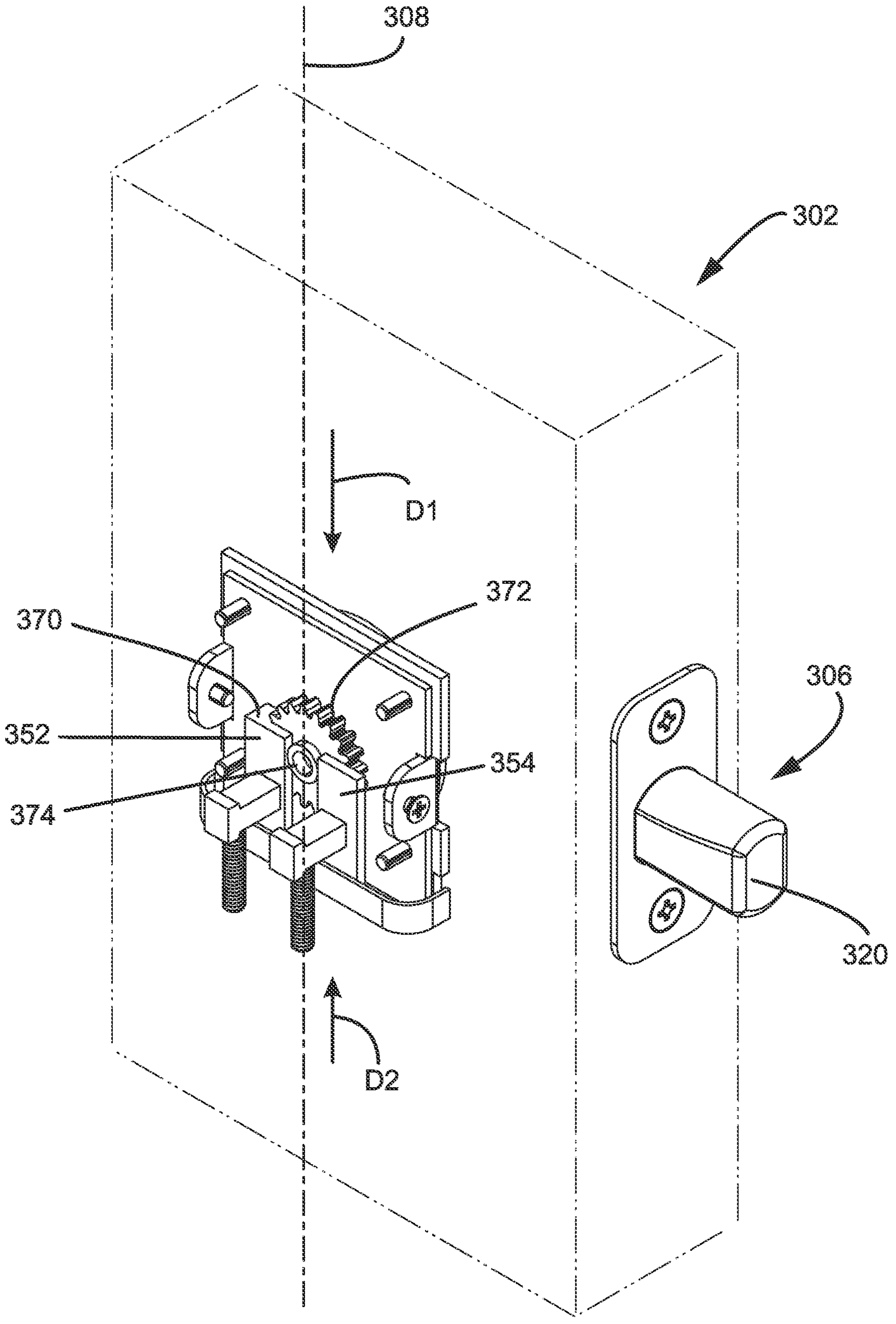
FIG. 21 is a perspective view of the deadbolt of FIG. 16 with the cover plate removed, with the deadbolt shown in extended position.
Figure 22:
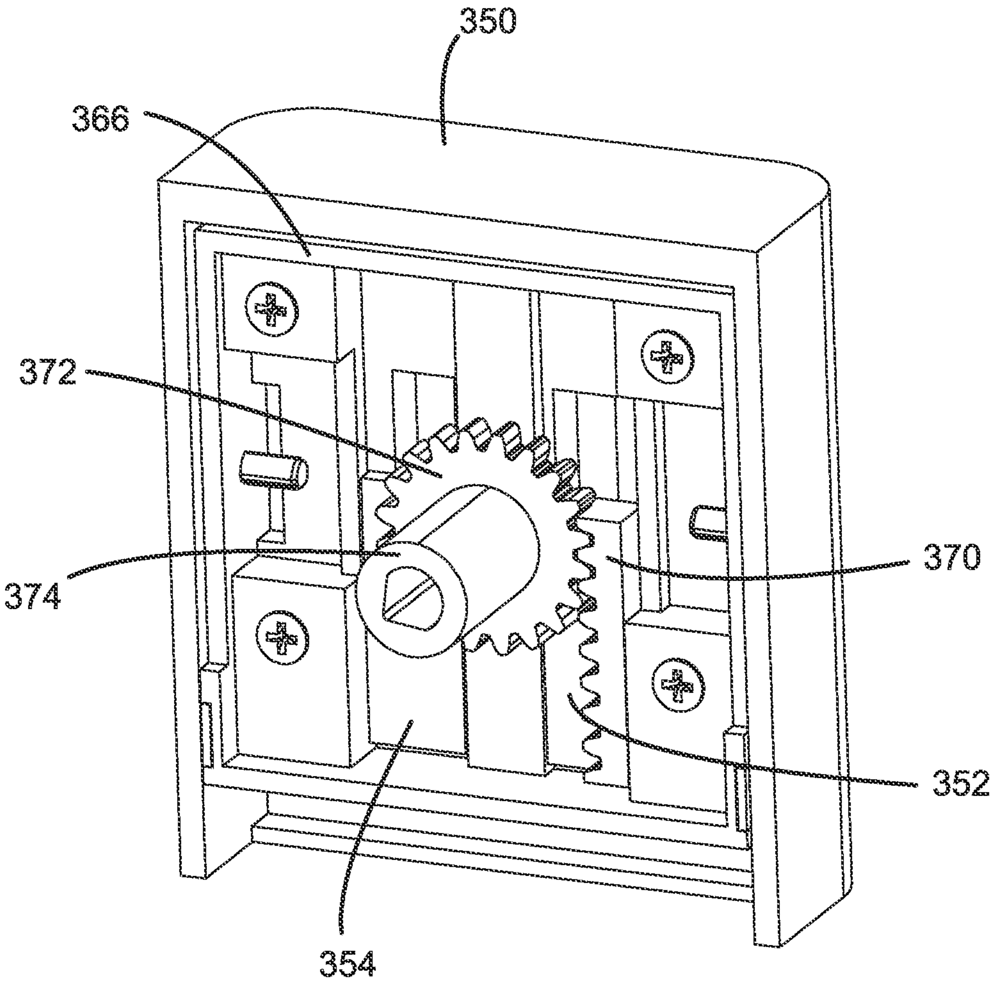
FIG. 22 is a cross-sectional view of the deadbolt of FIG. 16.

FIGS. 20 and 21 are perspective views of the deadbolt 300 with the manual actuator 350 removed, and the bolt 320 in a retracted position 304. In FIG. 21, the bolt 320 is shown in the extended position 306. FIG. 22 is cross-sectional view of the deadbolt 300. Referring now to FIGS. 18-22, when the manual actuator 350 slides in the first and second linear directions D1, D2, the linear gear 370 rotates the circular gear 372 in clockwise and counterclockwise directions. For example, when the manual actuator 350 slides in the first linear direction D1 (e.g., downward), the linear gear 370 causes the circular gear 372 to rotate in a counterclockwise direction. When the manual actuator 350 slides in the second linear direction D2 (e.g., upward), the linear gear 370 causes the circular gear 372 to rotate in a clockwise direction.

The circular gear 372 is connected to a latch shaft 374 that extends through the intermediate plate 330 and the attachment plate 340, and that engages a cam 324 of a deadbolt latch 322. The latch shaft 374 rotates along with the circular gear 372 in the clockwise and counterclockwise directions when the circular gear 372 is rotated inside the interior assembly 314 by the linear gear 370. The rotation of the latch shaft 374 causes the cam 324 to move the bolt 320 between the retracted and extended positions 304, 306 to lock and unlock the door 302.

Figure 23:
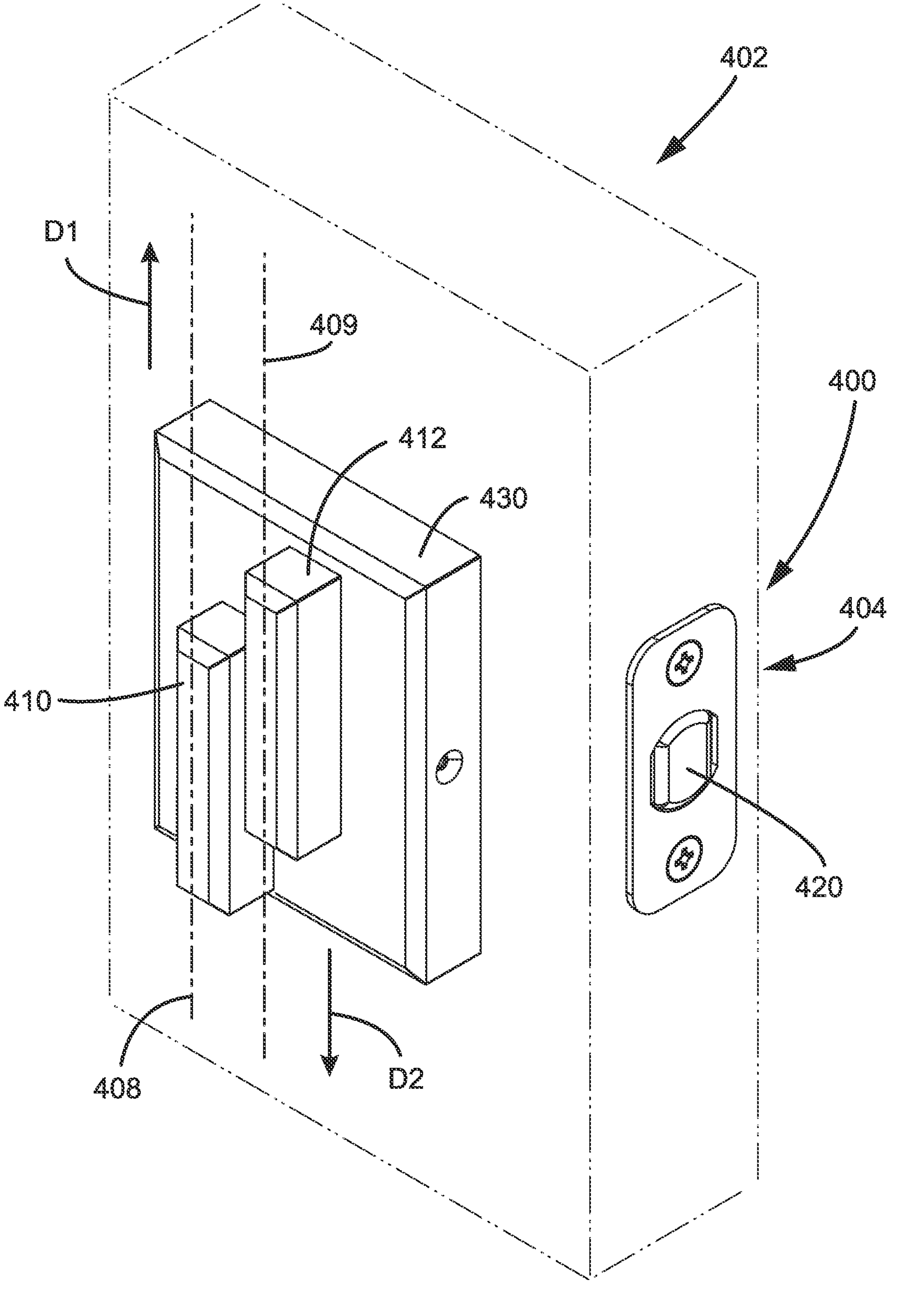
FIG. 23 is a perspective view of a deadbolt installed on an interior side of a door according to another embodiment, with the deadbolt shown in a retracted position.
Figure 24:
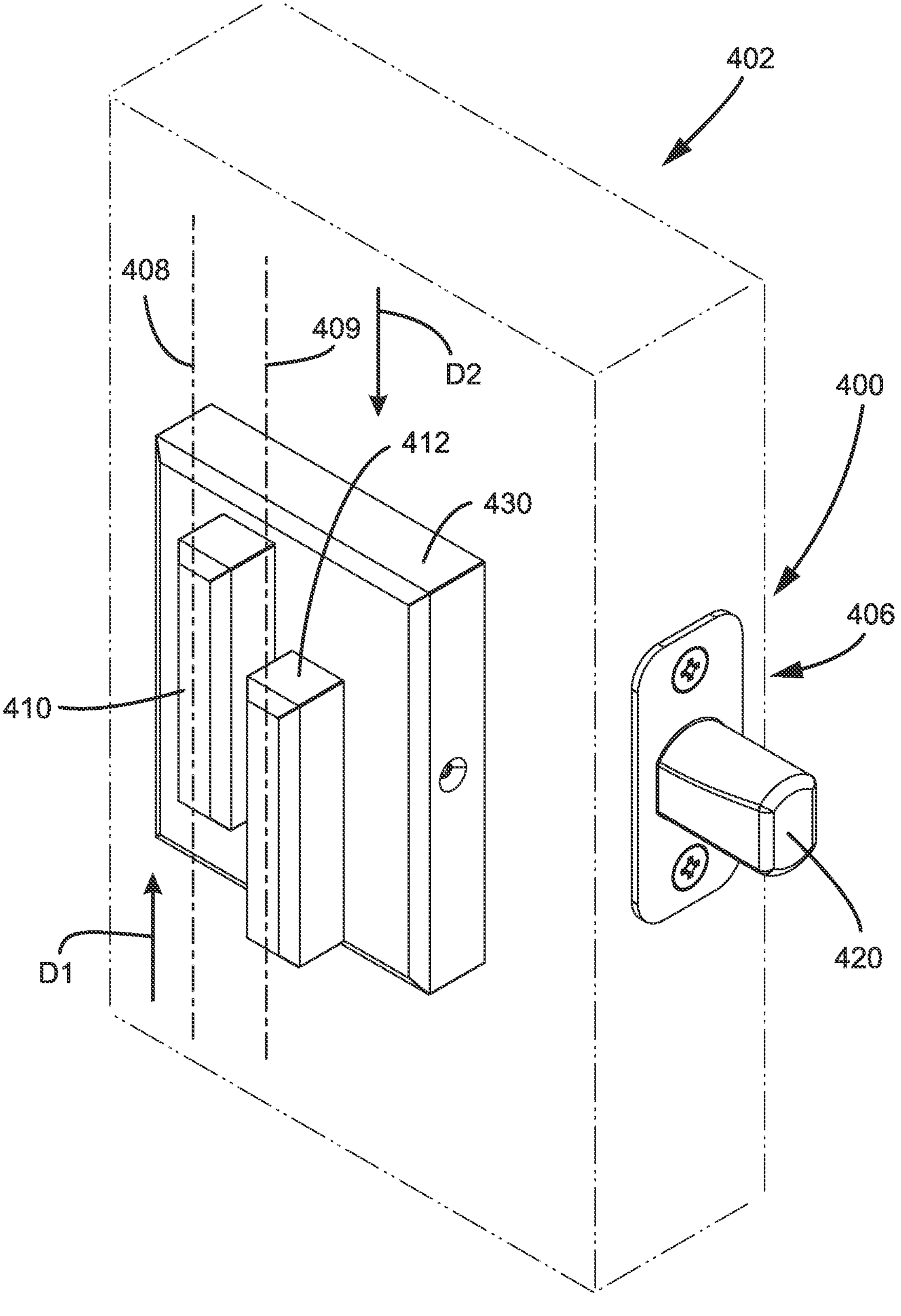
FIG. 24 is another perspective view of the deadbolt of FIG. 23 installed on the interior side of the door, with the deadbolt shown in an extended position.

FIGS. 23 and 24 are perspective views of a deadbolt 400 installed on an interior side of a door 402 according to another embodiment. In FIG. 23, the deadbolt 400 includes a bolt 420 that is shown in a retracted position 404. In FIG. 24, the bolt 420 is shown in an extended position 406. The deadbolt 400 includes first and second manual actuators 410, 412 that are each operable to slide in opposite first and second linear directions D1, D2 along parallel vertical axes 408, 409 to move the bolt 420 between the retracted position 404 and the extended position 406.

As shown in FIGS. 23 and 24, the first and second manual actuators 410, 412 are offset with respect to one another along the parallel vertical axes 408, 409. In one example embodiment, the first and second manual actuators 410, 412 are each rectangular shaped.

The first manual actuator 410 is operable to slide in a first linear direction D1 along the vertical axis 408 to move the bolt 420 from the retracted position 404 to the extended position 406. In the depicted embodiment, the first linear direction D1 is from down to up. In alternative embodiments, the first linear direction D1 is from up to down.

When the first manual actuator 410 is operated by a user to slide in the first linear direction D1, the second manual actuator 412 slides in the second linear direction D2 along the vertical axis 409. In the depicted embodiment, the second linear direction D2 is from up to down. In alternative embodiments, the second linear direction D2 is from down to up.

The second manual actuator 412 is operable to slide in the second linear direction D2 along the vertical axis 409 to move the bolt 420 from the retracted position 404 to the extended position 406. When the second manual actuator 412 slides in the second linear direction D2, the first manual actuator 410 slides in the first linear direction D1 along the vertical axis 408.

When the first manual actuator 410 slides in the second linear direction D2, the second manual actuator 412 slides in the first linear direction D1 along the vertical axis 409. When the second manual actuator 412 slides in the first linear direction D1, the first manual actuator 410 slides in the second linear direction D2 along the vertical axis 408.

Figure 25:
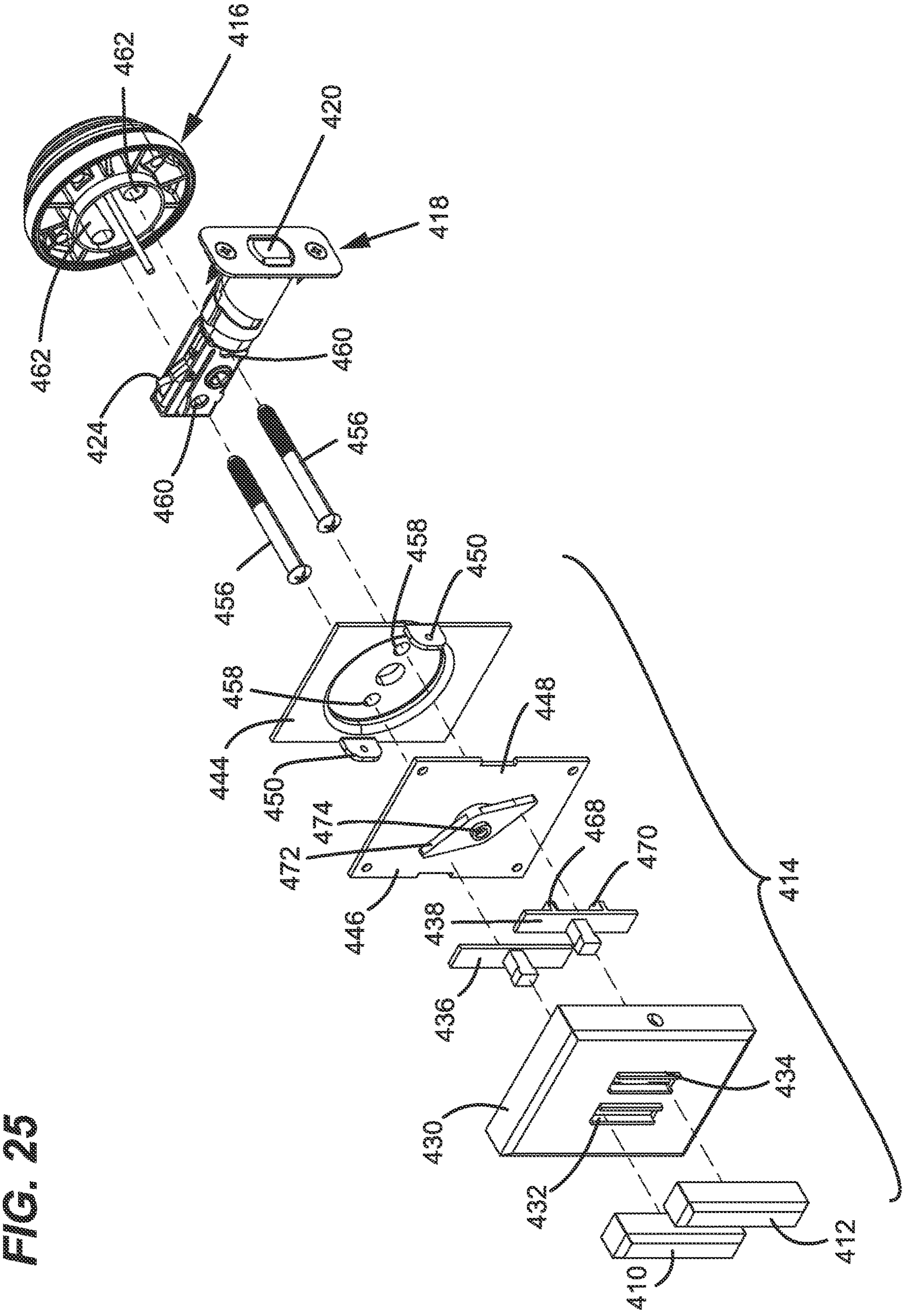
FIG. 25 is an exploded perspective view of the deadbolt of FIG. 23.
Figure 26:
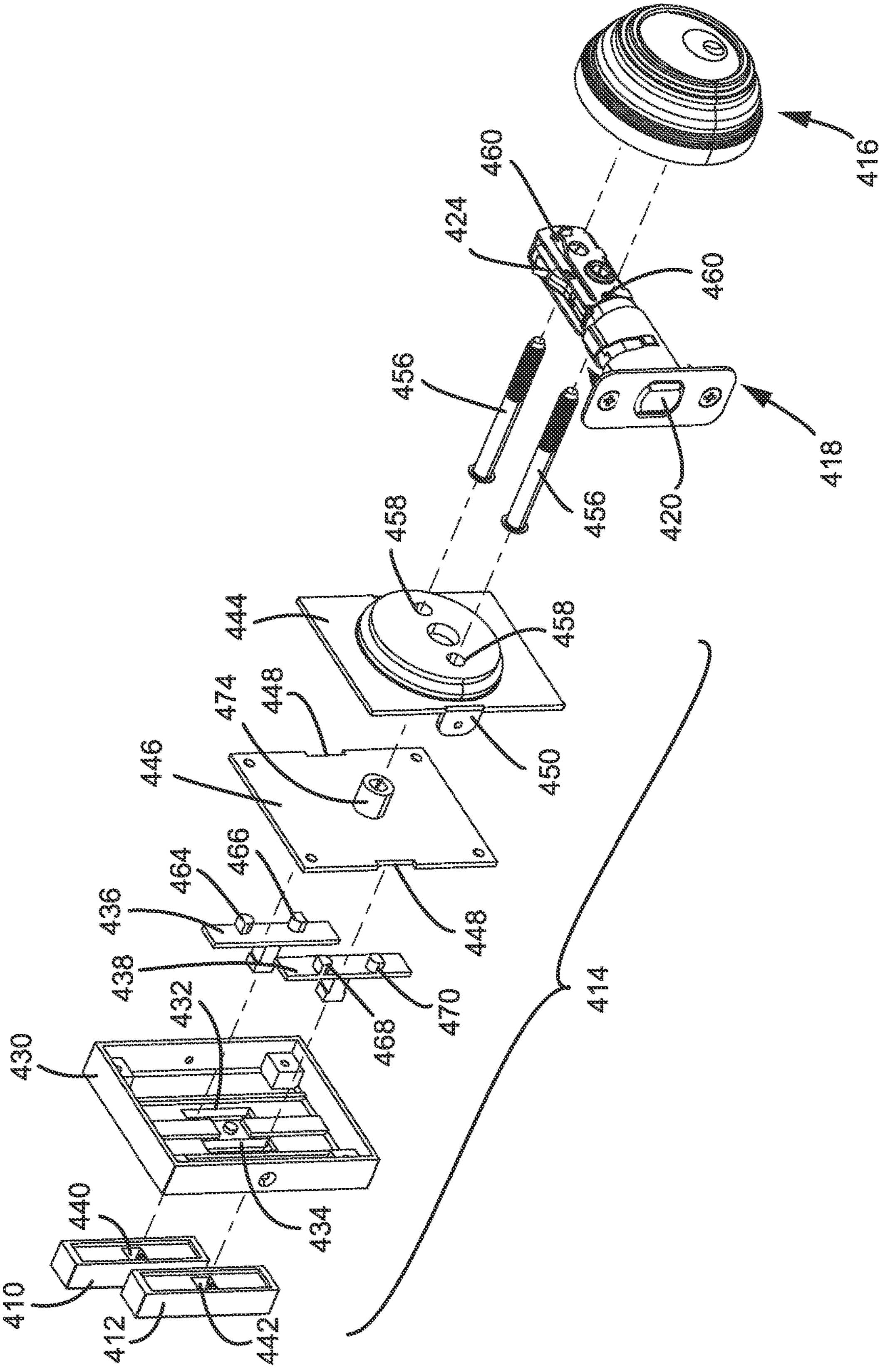
FIG. 26 is another exploded perspective view of the deadbolt of FIG. 23.

FIGS. 25 and 26 are exploded perspective views of the deadbolt 400. The deadbolt 400 includes an interior assembly 414, an exterior assembly 416, and a bolt assembly 418. The exterior assembly 416 and bolt assembly 418 are substantially the same as the exterior assembly 116 and bolt assembly 118 described above with respect to the deadbolt 100.

The interior assembly 414 includes the first and second manual actuators 410, 412 mounted over a cover plate 430. The cover plate 430 includes slots 432, 434 that receive first and second drivers 436, 438. The slots 432, 434 are spaced apart and are substantially parallel.

The first and second drivers 436, 438 attach to corresponding sockets 440, 442 on interior surfaces of the first and second manual actuators 410, 412. The first and second drivers 436, 438 are fixed to the first and second manual actuators 410, 412 such that the first and second drivers 436, 438 slide in the first and second linear directions D1, D2 when the first and second manual actuators 410, 412 are operated by a user. The first and second drivers 436, 438 fix the first and second manual actuators 410, 412 to the cover plate 430 in a plane orthogonal to the cover plate 430 such that the manual actuators cannot be pulled off of the cover plate 430.

The cover plate 430 is mounted to an attachment plate 444, and an intermediate plate 446 is positioned inside the interior assembly 414 between the cover plate 430 and the attachment plate 444. The attachment plate 444 and the intermediate plate 446 are substantially similar to the attachment plate 258 and the intermediate plate 257 described above with respect to the deadbolt 200. For example, the intermediate plate 446 is fixedly positioned relative to the attachment plate 444 inside the interior assembly 414 by one or more grooves 448 that correspond to one or more flanges 450 that extend orthogonally from the attachment plate 444.

The attachment plate 444 attaches to the interior side of the door 402 by elongated fasteners 456 such as screws that are threaded through holes 458 of the attachment plate 444, and through corresponding holes 460 in the bolt assembly 418 and into fastener receiving apertures 462 in the exterior assembly 416. Thus, the elongated fasteners 456 fixedly secure the interior assembly 414, bolt assembly 418, and exterior assembly 416 to the door 402.

The first driver 436 has first and second pivot points 464, 466, and the second driver 438 includes first and second pivot points 468, 470. A cam 472 is engaged between the first and second pivot points 464, 466 of the first driver 436 and between the first and second pivot points 468, 470 of the second driver 438. The cam 472 rotates in clockwise and counterclockwise directions when the first and second manual actuators 410, 412 (and corresponding first and second drivers 436, 438) slide in the first and second linear directions D1, D2.

Figure 27:
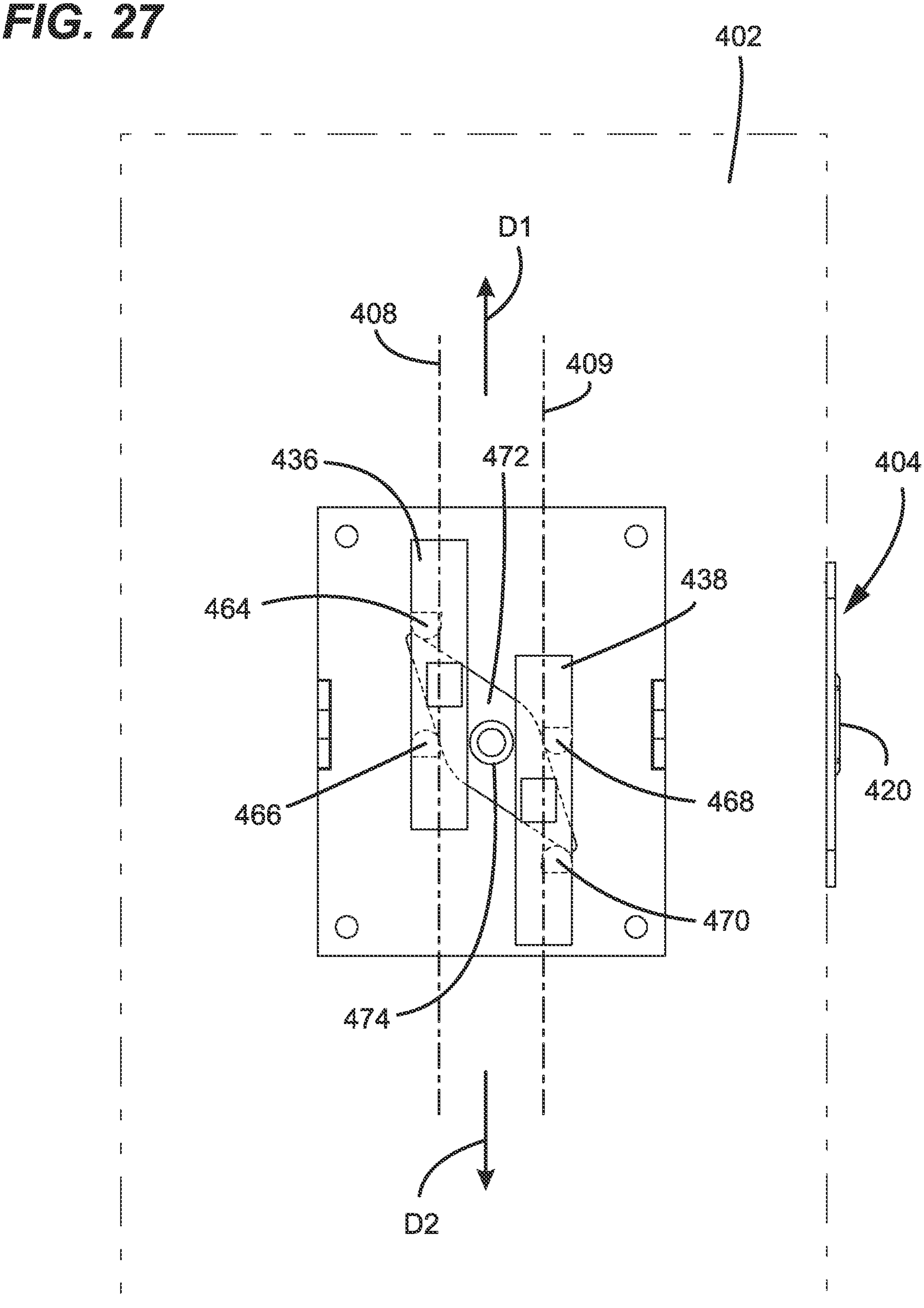
FIG. 27 is a front view of the deadbolt of FIG. 23 with a cover plate removed, with the deadbolt shown in the retracted position.
Figure 28:
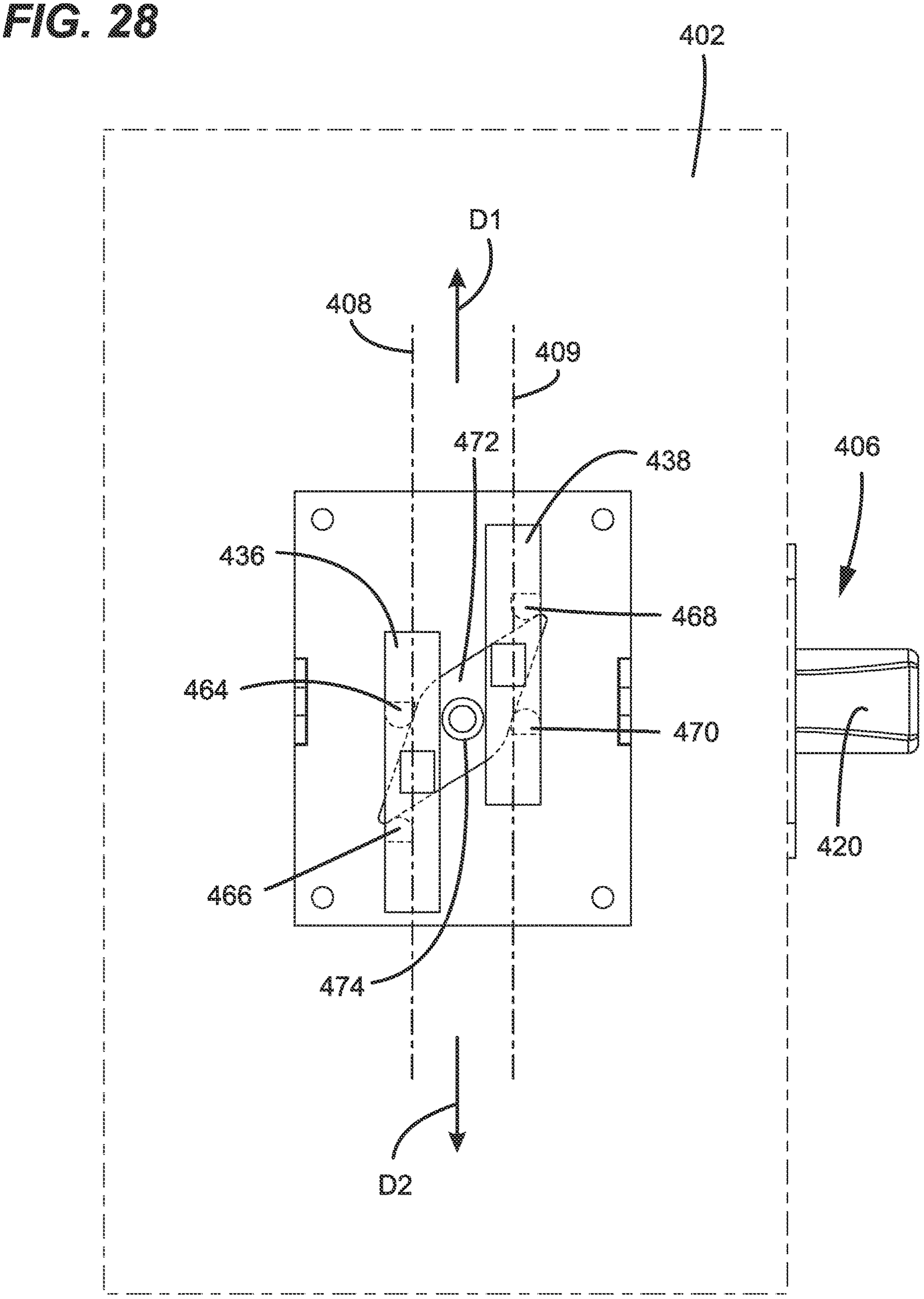
FIG. 28 is a front view of the deadbolt of FIG. 23 with the cover plate removed, with the deadbolt shown in the extended position.

FIGS. 27 and 28 are front views of the deadbolt 400 with the cover plate 430 removed therefrom. In FIG. 27, the deadbolt 400 is shown in the retracted position 404 while in FIG. 28, the deadbolt 400 is shown in the extended position 406. Referring now to FIGS. 27 and 28, when the first manual actuator 410 slides in the first linear direction D1 (e.g., downward), the cam 472 is rotated in a counterclockwise direction by the first and second pivot points 464, 466 of the first driver 436. Similarly, when the second manual actuator 412 slides in the second linear direction D2 (e.g., upward), the cam 472 is rotated in a counterclockwise direction by the first and second pivot points 468, 470 of the second driver 438.

When the first manual actuator 410 slides in the second linear direction D2 (e.g., upward), the cam 472 is rotated in a clockwise direction by the first and second pivot points 464, 466 of the first driver 436. Similarly, when the second manual actuator 412 slides in the first linear direction D1 (e.g., downward), the cam 472 is rotated in a clockwise direction by the first and second pivot points 468, 470 of the second driver 438.

Referring now to FIGS. 25 and 26, the cam 472 is connected to a latch shaft 474 that extends through the intermediate plate 446 and the attachment plate 444, and that engages a cam 424 of a deadbolt latch 422 of the bolt assembly 418. The latch shaft 474 rotates along with the cam 472 in the clockwise and counterclockwise directions when the cam 472 is rotated inside the interior assembly 414 by the first and second drivers 436, 438. The rotation of the latch shaft 474 causes the cam 424 of the deadbolt latch 422 to move the bolt 420 in a linear direction between the retracted and extended positions 404, 406 to lock and unlock the door 402.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A deadbolt comprising:

a bolt assembly structured to mount inside a cavity between interior and exterior sides of a door, the bolt assembly including a bolt housed inside a deadbolt latch;

an exterior assembly structured to mount onto the exterior side of the door, the exterior assembly being operably connected to the deadbolt latch to move the bolt between a retracted position and an extended position; and an interior assembly structured to mount onto the interior side of the door, the interior assembly being operably connected to the deadbolt latch and including a manual actuator being operable to slide in opposite first and second linear directions causing the deadbolt latch to move the bolt between the retracted and extended positions, wherein the manual actuator is positionable in at least a first position that is in the first linear direction and corresponding to the retracted position of the bolt and an opposite second position that is in the second linear direction and corresponding to the extended position of the bolt, wherein the first and second positions of the manual actuator maintain the position of the bolt until the manual actuator is manually actuated, and wherein the interior assembly further includes:

a linear gear attached to the manual actuator;

a circular gear engaged with the linear gear such that the linear gear causes the circular gear to rotate in clockwise and counterclockwise directions when the manual actuator is operated to slide in the first and second linear directions; and a latch shaft engaged with the circular gear, wherein rotation of the circular gear causes the latch shaft to rotate, and rotation of the latch shaft causes a cam in the deadbolt latch to move the bolt in a linear direction between the retracted and extended positions.

2. The deadbolt of claim 1, wherein the first and second linear directions are first and second vertical directions along an axis parallel to a height of the door.

3. The deadbolt of claim 1, wherein the exterior assembly further includes:

a plug housed inside the exterior assembly, the plug defining a keyhole; and a tailpiece that extends from the plug and rotates when a key inserted into the keyhole is rotated, wherein rotation of the tailpiece causes the deadbolt latch to move the bolt between the retracted and extended positions.

4. The deadbolt of claim 1, further comprising a housing nested inside the manual actuator, the housing including rails on opposite sides, and wherein the manual actuator is mounted to slide on the rails of the housing in the first and second linear directions.

5. The deadbolt of claim 4, wherein the housing has a display that is viewable when the bolt is in the retracted position, and that is hidden when the bolt is in the extended position, the display indicating that the bolt is in the retracted position.

6. The deadbolt of claim 1, wherein the manual actuator covers the interior assembly.

7. The deadbolt of claim 1, wherein the first and second linear directions are first and second vertical directions along an axis parallel to a height of the door.

8. A deadbolt comprising:

a bolt assembly structured to mount inside a cavity between interior and exterior sides of a door, the bolt assembly including a bolt housed inside a deadbolt latch and configured to move between a retracted position and an extended position;

an exterior assembly structured to mount onto the exterior side of the door, the exterior assembly being operably connected to the deadbolt latch; and an interior assembly including:

an attachment plate structured to mount onto the interior side of the door;

an intermediate plate mounted over the attachment plate, wherein a latch shaft is rotatably mounted on the intermediate plate and operably connected to the deadbolt latch;

a housing mounted over at least the intermediate plate;

at least one driver slidably supported on the housing and configured to drive rotation of the latch shaft, wherein the at least one driver slides in a direction that is parallel to the interior side of the door;

a manual actuator fixed to the at least one driver and at least partially covering the housing, wherein the manual actuator is configured to slide in opposite first and second linear directions causing the at least one driver to rotate the latch shaft and move the bolt between the retracted and extended positions, wherein the manual actuator is positionable in at least a first position that is in the first linear direction and corresponding to the retracted position of the bolt and an opposite second position that is in the second linear direction and corresponding to the extended position of the bolt, wherein the first and second positions of the manual actuator maintain the position of the bolt until the manual actuator is manually actuated;

a linear gear attached to the at least one driver; and a circular gear engaged with the linear gear such that the linear gear causes the circular gear to rotate in clockwise and counterclockwise directions when the manual actuator is operated to slide in the first and second linear directions, wherein the latch shaft is engaged with the circular gear, and wherein rotation of the circular gear causes the latch shaft to rotate, and rotation of the latch shaft causes a cam in the deadbolt latch to move the bolt in a linear direction between the retracted and extended positions.

9. The deadbolt of claim 8, wherein the housing includes a display configured to indicate a position of the bolt.

10. The deadbolt of claim 9, wherein the display is exposed when the manual actuator is positioned such that the bolt is in the retracted position.

11. The deadbolt of claim 9, wherein the display is color coded based on the position of the bolt.

12. The deadbolt of claim 9, wherein the housing includes a bottom portion that has the display.

13. The deadbolt of claim 8, wherein the housing includes rails on opposite sides, the rails slidingly engaged with the manual actuator.

14. The deadbolt of claim 8, wherein the at least one driver includes a first driver and a second driver.

15. The deadbolt of claim 14, wherein the manual actuator defines an interior surface defining a first socket and a second socket that at least partially receives the first driver and the second driver respectively.

16. The deadbolt of claim 14, wherein the second driver does not include a linear gear.

17. The deadbolt of claim 14, wherein the first driver includes a first setscrew and the second driver includes a second setscrew, the first and second setscrews configured to engage an internal surface of the housing.

18. The deadbolt of claim 8, wherein the first and second linear directions are first and second vertical directions along an axis parallel to a height of the door.

* * * * *